United States Patent
Richards et al.

(10) Patent No.: US 10,250,755 B2
(45) Date of Patent: Apr. 2, 2019

(54) SYSTEM AND METHOD FOR REAL-TIME ANALYSIS OF NETWORK TRAFFIC

(71) Applicant: NETWORK KINETIX, LLC, Austin, TX (US)

(72) Inventors: Carissa Richards, Georgetown, TX (US); Peter Richards, Georgetown, TX (US)

(73) Assignee: NETWORK KINETIX, LLC, Austin, TX (US)

( * ) Notice: Subject to any disclaimer, the term of this patent is extended or adjusted under 35 U.S.C. 154(b) by 0 days.

(21) Appl. No.: 15/925,357

(22) Filed: Mar. 19, 2018

(65) Prior Publication Data

US 2018/0213089 A1 Jul. 26, 2018

Related U.S. Application Data

(63) Continuation of application No. 15/783,446, filed on Oct. 13, 2017, now Pat. No. 9,955,023, which is a
(Continued)

(51) Int. Cl.
*H04M 15/00* (2006.01)
*H04M 3/22* (2006.01)
(Continued)

(52) U.S. Cl.
CPC ........ *H04M 15/47* (2013.01); *G06F 9/45558* (2013.01); *G06F 9/5016* (2013.01);
(Continued)

(58) Field of Classification Search
CPC . H04L 41/5051; H04L 41/0816; H04L 41/16; H04L 41/142; H04L 41/5009;
(Continued)

(56) References Cited

U.S. PATENT DOCUMENTS

| 5,331,550 | A | * | 7/1994 | Stafford | G06K 9/3233 |
| | | | | | 382/128 |
| 6,571,285 | B1 | * | 5/2003 | Groath | H04L 41/0631 |
| | | | | | 370/352 |

(Continued)

FOREIGN PATENT DOCUMENTS

| EP | 1684463 A1 * | 7/2006 | ........... H04L 43/026 |
| WO | WO-9839899 A1 * | 9/1998 | ............. H04L 63/14 |

(Continued)

*Primary Examiner* — Kostas J Katsikis

(57) ABSTRACT

A system for monitoring a live-data flow through a network includes at least one server communicating with the network. A processor within each of the at least one server implements a first processing node for monitoring a mirrored live-data flow of the live-data flow passing through at least one selected point within the network in a non-intrusive manner that does not affect the live-data flow passing through the at least one selected point. The first processing node decodes data within the mirrored live-data flow according to each protocol associated with the data. The first processing node detects at least one predetermined or deduced condition defined by at least one of a plurality of applications implemented on a second processing node and executes at least one predetermined or deduced response responsive to an indication of occurrence of the at least one predetermined or deduced condition within the decoded data. The first processing node also forwards data from the first processing node to a second processing node data from at least one of the plurality of simultaneous live-data flows based upon occurrence of the at least one predetermined or deduced condition. The processor within the at least one server the processor further implements the second processing node for accessing from the second processing node, external data from an external data source. The second processing node also processes at least a portion of the data forwarded from the first processing node using at least one
(Continued)

of the plurality of applications implemented on the second processing node and the external data. The processing of the data by the at least one of the plurality of applications and the external data causes execution of the at least one predetermined or deduced response to determine a manner for controlling an operation of the network at a same time the live-data flow is in active transmission between the endpoints in the network. The operation of the network is controlled in response to the executed at least one predetermined or deduced response while events associated with the live-data flow are occurring within the network.

31 Claims, 21 Drawing Sheets

Related U.S. Application Data continuation of application No. 15/345,972, filed on Nov. 8, 2016, now Pat. No. 9,819,807, which is a continuation of application No. 15/180,496, filed on Jun. 13, 2016, now Pat. No. 9,529,621, which is a continuation of application No. 14/962,660, filed on Dec. 8, 2015, now Pat. No. 9,369,366, which is a continuation of application No. 14/596,781, filed on Jan. 14, 2015, now Pat. No. 9,210,061, which is a continuation of application No. 14/485,172, filed on Sep. 12, 2014, now Pat. No. 8,966,074.

(60) Provisional application No. 61/877,810, filed on Sep. 13, 2013.

(51) Int. Cl.
　　　H04L 12/801　　(2013.01)
　　　H04L 12/24　　(2006.01)
　　　G06F 9/455　　(2018.01)
　　　G06F 9/50　　(2006.01)
　　　H04L 12/26　　(2006.01)

(52) U.S. Cl.
　　　CPC .......... H04L 41/0816 (2013.01); H04L 41/16 (2013.01); H04L 43/16 (2013.01); H04L 47/10 (2013.01); H04M 3/2218 (2013.01); H04M 15/8214 (2013.01); H04M 15/8228 (2013.01); *G06F 2009/45583* (2013.01); *G06F 2009/45591* (2013.01); *G06F 2009/45595* (2013.01); *H04L 41/142* (2013.01); *H04L 41/5009* (2013.01)

(58) Field of Classification Search
　　　CPC ..... H04L 47/10; H04L 43/16; H04L 43/0894; H04M 15/47; H04M 15/8214; H04M 15/8228; H04M 3/2218; G06F 9/5016; G06F 9/45558; G06F 2009/45583; G06F 2009/45591; G06F 2009/45595
　　　See application file for complete search history.

(56) References Cited

U.S. PATENT DOCUMENTS

| | | | | |
|---|---|---|---|---|
| 6,850,965 | B2* | 2/2005 | Allen | H04L 29/06 348/E5.008 |
| 6,873,617 | B1* | 3/2005 | Karras | H04M 3/2218 370/389 |
| 7,162,489 | B2* | 1/2007 | Folting | G06F 17/30592 707/600 |
| 7,188,053 | B2* | 3/2007 | Nikitin | G06F 17/18 702/188 |
| 7,310,590 | B1* | 12/2007 | Bansal | G06F 11/0715 702/181 |
| 7,346,688 | B2* | 3/2008 | Allen | H04L 29/06 370/232 |
| 7,383,338 | B2* | 6/2008 | Allen | H04L 29/06 370/232 |
| 7,397,764 | B2* | 7/2008 | Cherian | H04L 47/10 370/235 |
| 7,739,211 | B2* | 6/2010 | Coffman | G06Q 30/02 706/45 |
| 7,747,748 | B2* | 6/2010 | Allen | H04L 29/06 370/232 |
| 7,856,411 | B2* | 12/2010 | Darr | G06Q 10/10 706/45 |
| 7,890,631 | B2* | 2/2011 | Allen | H04L 29/06 370/229 |
| 7,991,726 | B2* | 8/2011 | Zhou | H04L 63/1416 706/47 |
| 8,291,058 | B2* | 10/2012 | Head | H04L 69/12 707/776 |
| 8,544,100 | B2* | 9/2013 | Ramcharran | H04L 63/0428 726/25 |
| 8,619,579 | B1* | 12/2013 | Rothstein | H04L 43/026 370/235 |
| 8,682,812 | B1* | 3/2014 | Ranjan | H04L 63/1425 706/12 |
| 8,738,652 | B2* | 5/2014 | Kramer | G06F 17/30539 707/776 |
| 8,762,298 | B1* | 6/2014 | Ranjan | G06N 5/02 706/12 |
| 8,769,373 | B2* | 7/2014 | Rogers, Jr. | G06F 21/00 714/752 |
| 8,869,281 | B2* | 10/2014 | Call | H04L 63/1425 726/23 |
| 9,253,068 | B1* | 2/2016 | Wu | H04L 63/0245 |
| 9,832,105 | B2* | 11/2017 | Burgio | H04L 45/22 |
| 2001/0055274 | A1* | 12/2001 | Hegge | H04L 43/026 370/229 |
| 2002/0029274 | A1* | 3/2002 | Allen | H04L 29/06 709/226 |
| 2003/0236652 | A1* | 12/2003 | Scherrer | G06F 21/552 703/2 |
| 2004/0218531 | A1* | 11/2004 | Cherian | H04L 47/10 370/235 |
| 2005/0120131 | A1* | 6/2005 | Allen | H04L 29/06 709/233 |
| 2006/0218281 | A1* | 9/2006 | Allen | H04L 29/06 709/226 |
| 2006/0224768 | A1* | 10/2006 | Allen | H04L 29/06 709/234 |
| 2006/0235901 | A1* | 10/2006 | Chan | H04L 47/10 |
| 2007/0094397 | A1* | 4/2007 | Krelbaum | H04L 43/065 709/227 |
| 2007/0289013 | A1* | 12/2007 | Lim | G06F 21/552 726/22 |
| 2007/0294187 | A1* | 12/2007 | Scherrer | G06Q 20/401 705/75 |
| 2008/0075017 | A1* | 3/2008 | Kramer | H04L 12/66 370/252 |
| 2008/0109730 | A1* | 5/2008 | Coffman | G06Q 30/02 715/733 |
| 2008/0228921 | A1* | 9/2008 | Allen | H04L 29/06 709/226 |
| 2008/0304483 | A1* | 12/2008 | Williams | H04L 1/0041 370/389 |
| 2009/0234940 | A1* | 9/2009 | Pal | H04L 65/80 709/224 |
| 2012/0124200 | A1* | 5/2012 | Ramadass | H04L 63/1408 709/224 |
| 2014/0269276 | A1* | 9/2014 | Rothstein | H04L 43/0894 370/230 |
| 2014/0280889 | A1* | 9/2014 | Nispel | H04L 43/04 709/224 |

(56) References Cited

U.S. PATENT DOCUMENTS

2015/0358228 A1* 12/2015 Burgio .................... H04L 45/22
                                                              370/392
2017/0093678 A1*  3/2017 Gnanasekaran .... G06F 13/4022

FOREIGN PATENT DOCUMENTS

WO     WO-2005109754 A1 * 11/2005     ........... H04L 41/142
WO     WO-2011060377 A1 *  5/2011     ....... G06F 17/30964

* cited by examiner

SYSTEM AND METHOD FOR REAL-TIME ANALYSIS OF NETWORK TRAFFIC

This application is a continuation of U.S. patent application Ser. No. 15/783,446, filed on Oct. 13, 2017, entitled SYSTEM AND METHOD FOR REAL-TIME ANALYSIS OF NETWORK TRAFFIC, which is a continuation of U.S. patent application Ser. No. 15/345,972, filed on Nov. 8, 2016, now U.S. Pat. No. 9,819,807, issued on Nov. 14, 2017, entitled SYSTEM AND METHOD FOR REAL-TIME ANALYSIS OF NETWORK TRAFFIC, which is a continuation of U.S. patent application Ser. No. 15,180,496, filed on Jun. 13, 2016, now U.S. Pat. No. 9,529,621, issued on Dec. 27, 2016, entitled SYSTEM AND METHOD FOR REAL-TIME ANALYSIS OF NETWORK TRAFFIC, which is a continuation of U.S. patent application Ser. No. 14,962,660, filed on Dec. 8, 2015, now U.S. Pat. No. 9,369,366, issued on Jun. 14, 2016, entitled SYSTEM AND METHOD FOR REAL-TIME ANALYSIS OF NETWORK TRAFFIC, which is a continuation of U.S. patent application Ser. No. 14,596,781, filed on Jan. 14, 2015, now U.S. Pat. No. 9,210,061, issued Dec. 8, 2015 entitled SYSTEM AND METHOD FOR REAL-TIME ANALYSIS OF NETWORK TRAFFIC, which is a continuation of U.S. application Ser. No. 14,485,172, filed on Sep. 12, 2014, now U.S. Pat. No. 8,966,074, issued on Feb. 24, 2015, entitled SYSTEM AND METHOD FOR REAL-TIME ANALYSIS OF NETWORK TRAFFIC, which claims benefit of U.S. Provisional Application No. 61/877,810, filed Sep. 13, 2013, entitled REAL TIME ANALYSIS OF NETWORK TRAFFIC, the specifications of which are incorporated by reference herein in their entirety.

TECHNICAL FIELD

The invention relates to voice and data networks, and more particularly to the real-time analysis of a live-data stream resulting in a situational deduction simultaneous to the live-data transmission over the voice and data networks, and as a result providing an opportunity to make effective an alert or action that now affects a set of probable outcomes before that data in transmission exits the network, or becomes at rest as a stored event, log record, or application record of what has already happened as the only outcome.

BACKGROUND

The proliferation of internet- and mobile-connected devices—the 'Internet of Everything'—has increased data traffic volume, transmission speeds and usage on communications networks. The ubiquity of device types and connections (cellular, wireless, multi-SIM, machine-to-machine) and the expansion of usage types (voice, high-definition video, music, data) have also made it more complex to monitor and secure these networks and to conduct analysis on the traffic and content.

To accomplish this, the traffic must be instrumented (what data is moving across the network), analyzed (what is the content of the traffic), and understood (what are the implications of this) so a relevant decision can be made or action taken within the available window of opportunity. This is especially so in the case of time-critical revenue, customer, operational, or security impacting events. Examples of such events include fraud occurring on mobile carrier networks, cellular zones dropping calls above an acceptable threshold, malfunctioning mobile applications, or malicious content or agents compromising a network.

This network data is captured by a variety of network probes sitting 'inline' (intrusively) inside the network. Network events must first 'complete' (example: after a voice call is completed and goes through 'call teardown') before they are translated into offline database records (example: Call Detail Records, Event Detail Records). These records are extracted at regular time intervals and provided to applications in offline enterprise data centers for post-event processing and analysis.

These systems can suffer from latency delays of up to 15 minutes for event data to be extracted and delivered to databases. In many cases, multiple terabytes of data are written into databases, posing 'Big Data' analytical challenges when time-critical results are needed. The inline hardware represents significant capital expenditures. These types of systems also provide a limited ability to respond flexibly to live conditions, as the application layer is not integrated contextually within the data collection layer. Database records are not generated for some network events that may provide indications of fraud or other critical issues that must be detected.

A use case is mobile carrier fraud detection that utilizes call detail records that have been delivered to a data warehouse after the relevant network traffic or calls have been completed. Detection of fraud in this case occurs after the actual fraudulent even has occurred, and in many cases, the carrier has already incurred a financial loss. Any actions taken to remediate (example: block the caller) can only be applied to the next time a relevant event appears in the network.

The present invention, as disclosed and described herein, in one aspect thereof, comprises a system for monitoring a live-data flow through a network. The system includes at least one server communication with the network and at least one network interface associated with the at least one server for providing access to the live-data flow through the network. A processor within each of the at least one serve implements a first processing node for monitoring a mirrored live-data flow of the live-data flow passing through at least one selected point within the network in a non-intrusive manner that does not affect the live-data flow passing through the at least one selected point. The live-data flow comprises a plurality of simultaneous live-data flows that are in active transmission between endpoints in the network and prior to onward storage of the data in a database. The first processing node decodes data within the mirrored live-data flow according to each protocol associated with the data. The data has a plurality of protocols associated therewith, and the data is decoded in parallel according to each of the plurality of protocols. The first processing node detects at least one predetermined or deduced condition defined by at least one of a plurality of applications implemented on a second processing node. The first processing node also executes at least one predetermined or deduced response responsive to an indication of occurrence of the at least one predetermined or deduced condition within the decoded data. The first processing node also forwards data from the first processing node to a second processing node data from at least one of the plurality of simultaneous live-data flows based upon occurrence of the at least one predetermined or deducted condition defined by the at least one of the plurality of applications implements on the second processing node. The processor within the at least one server and the processor further implements the second processing node for accessing from the second processing node, external data from an external data source. The second processing node also processes at least a portion of the data forwarded from the first processing node using at least one of the plurality of applications implemented on the second processing node and the external data. The processing of the data by the at least of the plurality of applications and the external data causes execution of the at least one predetermined or deduced response to determine a manner for controlling an operation of the network at a same time the live-data flow is in active transmission between the endpoints in the network. The operation of the network is then controlled in response to the executed at least one predetermined or deduced response while events associated with the live-data flow are occurring within the network.

BRIEF DESCRIPTION OF THE DRAWINGS

For a more complete understanding, reference is now made to the following description taken in conjunction with the accompanying drawings in which.

DETAILED DESCRIPTION

Figure 1:
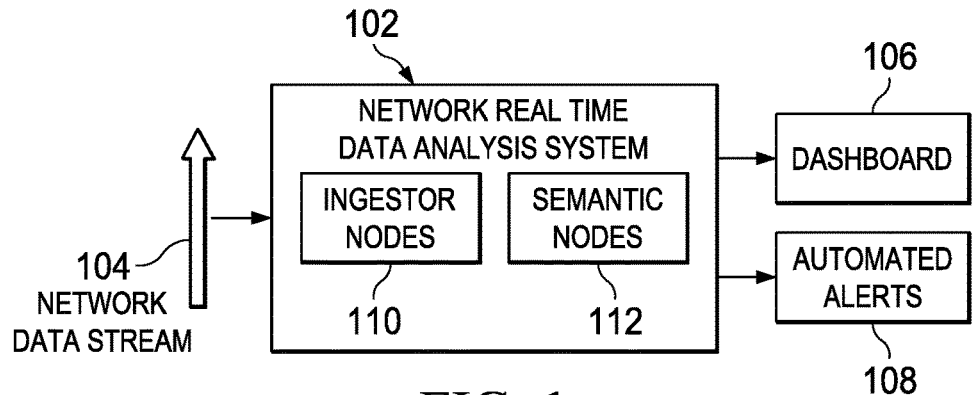
FIG. 1 illustrates the operational environment of a network live-data, real time data analysis system.

Referring now to the drawings, wherein like reference numbers are used herein to designate like elements throughout, the various views and embodiments of a system and method for real-time live-data analysts of network traffic are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated the operations environment of the network live-data, real-time analysis system 102 ("the System") according to the present disclosure. ARCHITECTURE: A system and methodology results in the ability to integrate an application and its relational language processing (example: SQL) in parallel and in real-time operational unity with network signaling, packet or data content ("network traffic") as it is in transmission ("live-data") and to make situational deductions and to take action on that live-data as it is being transmitted between points within a network. The usefulness here is the ability to take meaningful derived or deduced action on the information in transmission (or to use such information in relationship to other situations) to predictively inform of, alert on, alter or prepare for, or shape or execute a desired outcome, in advance if the live-data exiting the network and becoming a data center log record or database application event under its normal course of business operations.

The System 102 uses relational processing languages and techniques to enable detection of a situation in real-time and in parallel to its occurrence within a network, and not at a later point in time after the data has left the network for analysis based upon post-event data processing, which does not allow an opportunity to affect a change in outcome on that present event. The network traffic 104 is comprised of continuous transmissions of signaling and related data content (live-data) as can be found within voice communications or data networks such as those provided by mobile, broadband, or data communications network service providers. The System 102 provided any network provider (wireless carrier, fixed wire/line carrier, cable operator, etc.) an opportunity to detect and identify target events or patterns of data flow or relationships ("Events") occurring within its network traffic 104 as they occur and to automatically deduce and take predictively relevant actions or control responsive to the detection in a concurrent manner to those transmissions. The network live-data, real-time analysis, and deduction system 102 provides the automated action in any number of fashions, including, but not limited to providing information to a dashboard, web based or mobile device display 106 that responds to a deleted Event in parallel to the Event occurring and remaining open within the network traffic 104, or the generation of automated alerts 108 that may then be responded to manually or by the network.

Live-data is data that is in transmission between endpoints, not at rest within a database. Live-data is transient data in that it exists only for that period of time it is in transmission. The term "real-time" typically refers to the immediacy of a process or response to a query being made available in time for its usefulness. The term real time has noting to do with the age or relevancy of the data, but instead has everything to do with the timeliness of response relevant to a time period. The term real time is therefore an omni-available description that introduces a time period and that needs to be qualified as "real time to what?" Data that is time-critical relates to the period of urgency or usefulness applied to it. Real time live-data analysis is the time-critical processing of network traffic in parallel with its transmission and before such network traffic completes its transmission and exits the network to become an "already-happened" data event at rest.

The System 102 provides a non-intrusive process that enables data center logic to operate concurrently with the transmission before the transmission terminates and exits the network to become a data center application event, and additionally provides the ability for the data warehouse system to interact in a time-critical manner with the same network traffic 104 to provide contextualization of conditions based on trends or other data. The System 102 enables concurrent analysis and deduction of relationships and probabilities as Events occur and are transmitted as network traffic 104, thus allowing deductive parallel operations with the concurrently occurring network traffic and its operations. The System 102 does not reside within a data corner that operates on a sequence of post event analytical functions: rather it is architected as a larger network topology operating non-intrusively and in parallel to the network traffic 104

Within a network topology, the system is able to use one or more virtual machines as data collection devices ("ingestor node(s)") connected non-intrusively to network elements that provide a port mirror to non-intrusively ingest network traffic ("live-data source") to dynamically and continuously decode signaling packet or data content ("network traffic"), and action such identifiable selected network traffic to trap and generate immediate alerts, and additionally pass through or such selected subject matter for further processing simultaneously with and live to the network and becomes a data center log record or application event. The system 102 is in two parts, consisting of one or more ingestor nodes 110 and one or more semantic nodes 112. The ingestor node 110 enables a non-intrusive, direct mirroring of network traffic 104 and its content, and provided protocol decoding, data extraction, and prescribed Event alert capabilities. The ingestor node also feeds an assigned semantic node 112 with such prescribed traffic as required. The ingestor node 110 non-intrusively undertakes its analysis and alerts while a particular Event is occurring or in transmission.

The various rules in control that dynamically instruct ingestor nodes 110 as to what particular protocol and information is being sought to be alerted by the System 102 are provided by the semantic node 112. The semantic node provides one or more virtual machines for the purpose of collecting all or selective network traffic from the ingestor node(s) 110 and enabling access to relational language processing in combination with their application use cases and variable windows of time to provide analysis and reasoned deduction of outcomes of time-critical live-data situations for the generation of further alerts, intercept and interdiction actions ("semantic node(s)"), being able to affect a more desirable or predictable outcome of the network traffic, before the transmission exits the network and becomes a data center log record or application event. The primary functions of the semantic node 112 are to attach to the ingestor node 110 for the receipt of all ingestor node packets 1104. Functions include to receive selected ingestor node packets 1104; the preparation and management of time critical processes required by use case applications 1102 to process the described use cases; to provide fast in-memory storage for statistical models required by a use case application; to provide application visualization and system administration visualization through the visualization VM 1110; and to provide integrity check of packets mirrored to packets that exit the network.

The System 102 has the ability to process data from the network traffic 104 at gigabit speeds. The ingestor node 110 filter, decodes, undertakes prescribed alerts and feeds selective or all network traffic into the semantic node 112. The semantic node 112 undertakes application specific use case tasks including situational analysis, contextual reasoning and deductive processing according to rules, statistical models and, if any, subject matter databases attached to the semantic node 112.

Figure 2:
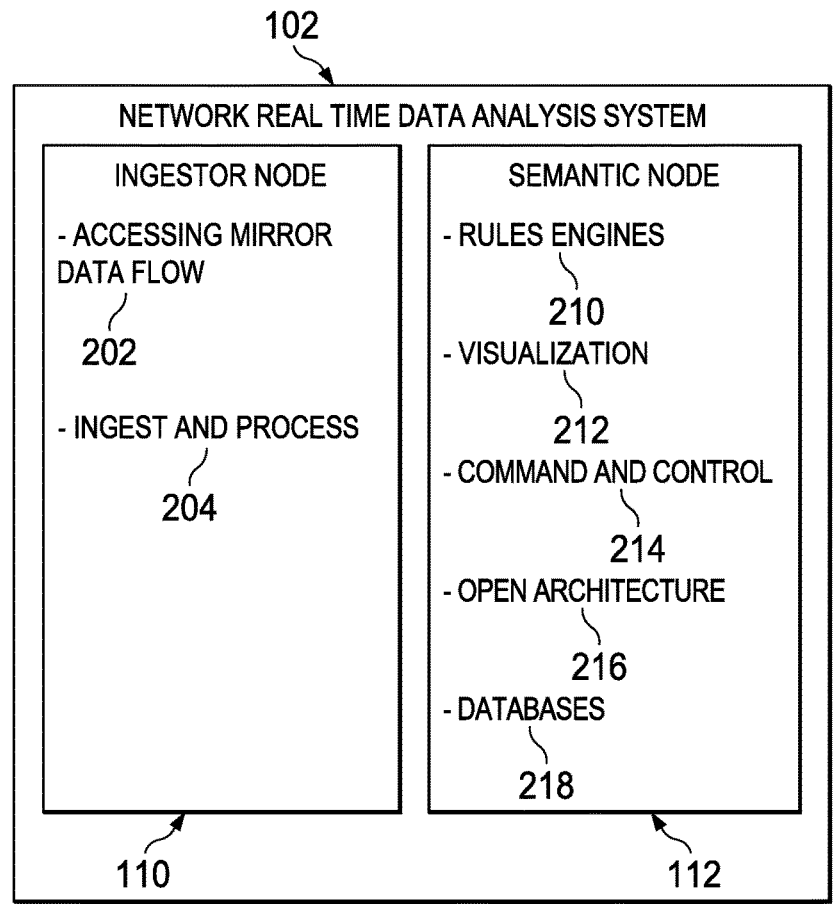
FIG. 2 is a functional block diagram of an ingestor node and a semantic node.

Referring now to FIG. 2, a more detailed illustration of the functioning of the system 102 is provided. The System 102 may include multiple ingestor nodes 110 that are each capable of providing a number of functionalities by way of accessing the mirrored data flow 202 provided by a targeted live-data source. Multiple ingestor nodes 110 are able to form a non-intrusive analytical grid with regard to the desired traffic flow to be analyzed. The ingestor node 110 is able to ingest and process mirrored network traffic 204 at network speeds. Each of the ingestor nodes 110 and semantic nodes 112 use in-memory database architectures, C++ programming language and commodity servers and operating systems.

The semantic node 112 provides rules engine functionalities 210, visualization functionality 212, and command and control framework 214 to provide for an application use case execution. The rules engine 210, visualization 212 and command and control 214 provide a manner for analyzing the received data according to a particular use case. Specific use cases are provided within this framework using an open application programming interface (API) application blade architecture 216 that enables a user to develop and add multiple application use cases to the System 102. The semantic node 112 can be expanded to incorporate SSD and hard drive databases 218 provided they are able to perform at the time-critical speeds of the live-data processing. In direct relation to an embedded use case, the semantic node 112 has the ability for internal contextual evolution of the application specific statistical models by way of contextual table update and dynamically allocated stored procedures. This provides a certain amount of internally biased (situational learning) based on the correctness of the recommended decisions and execution of each application use case. Multiple application can coexist and be implemented within the same semantic node 112 and processed from the same live-data input.

Figure 3:
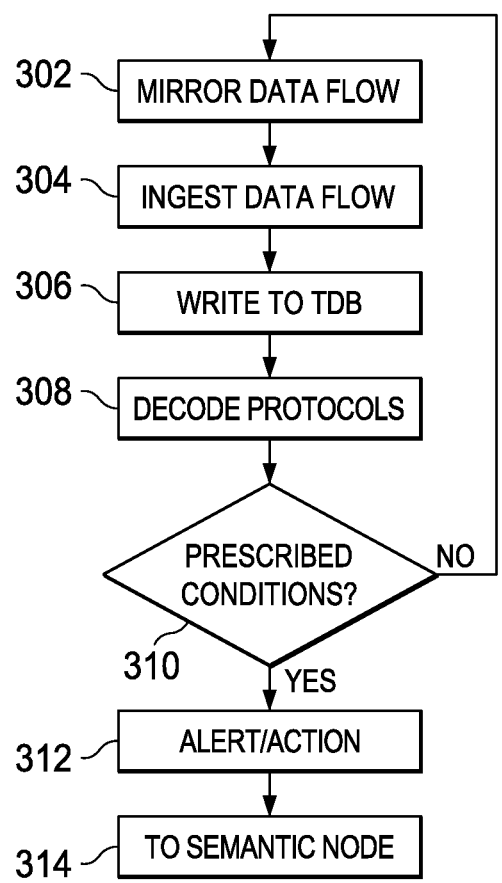
FIG. 3 is a flow diagram illustrating the process for monitoring of a network data stream.

Referring now to FIG. 3, there is a flow chart illustrating the operation of the system 102. The data flow is mirrored at step 302. Next at step 304, the ingestor node 110 ingests a mirrored copy of the network traffic provided by the live-data source using mobile network traffic as an example, the ingest VM 902 writes the network traffic into an allocated time dependent buffer (TDB) at step 306. The protocol decoder commences decoding at step 308 the contents of the TDB to find the protocol required. In the case of SS7 network traffic, there are many protocols. The decoder checks for these protocols, such as ISUP or TCAP/MAP protocols. If found, the decoder continues to decode, and retrieves any required information that may be present, such as a phone number. The process is granular in that it decodes small portions of the TDB rapidly to identify specific requirements before proceeding to decode the next set of requirements or the entire contents of the TDB. The decoded contents are passed to packet sniper for analysis in accord with a set of criteria for action at step 310.

If no prescribed conditions are detected, control passes back to step 302 and the process repeats. Once a particular prescribed condition is detected, the ingestor node 110 sends an alert to the semantic node 112 or undertakes a present action at step 312. This action could be to send a prescribed alert to network elements to truncate or trap and redirect that particular network traffic to other systems, included the semantic node, for processing. Such processing may include a change of content, copy of content or to create interdiction schemes for further network traffic of a like nature. All decoded network traffic is sent at step 314 to the semantic node 112 wherein such particular use case rules associated with any detected conditions is applied to the data.

Figure 4:
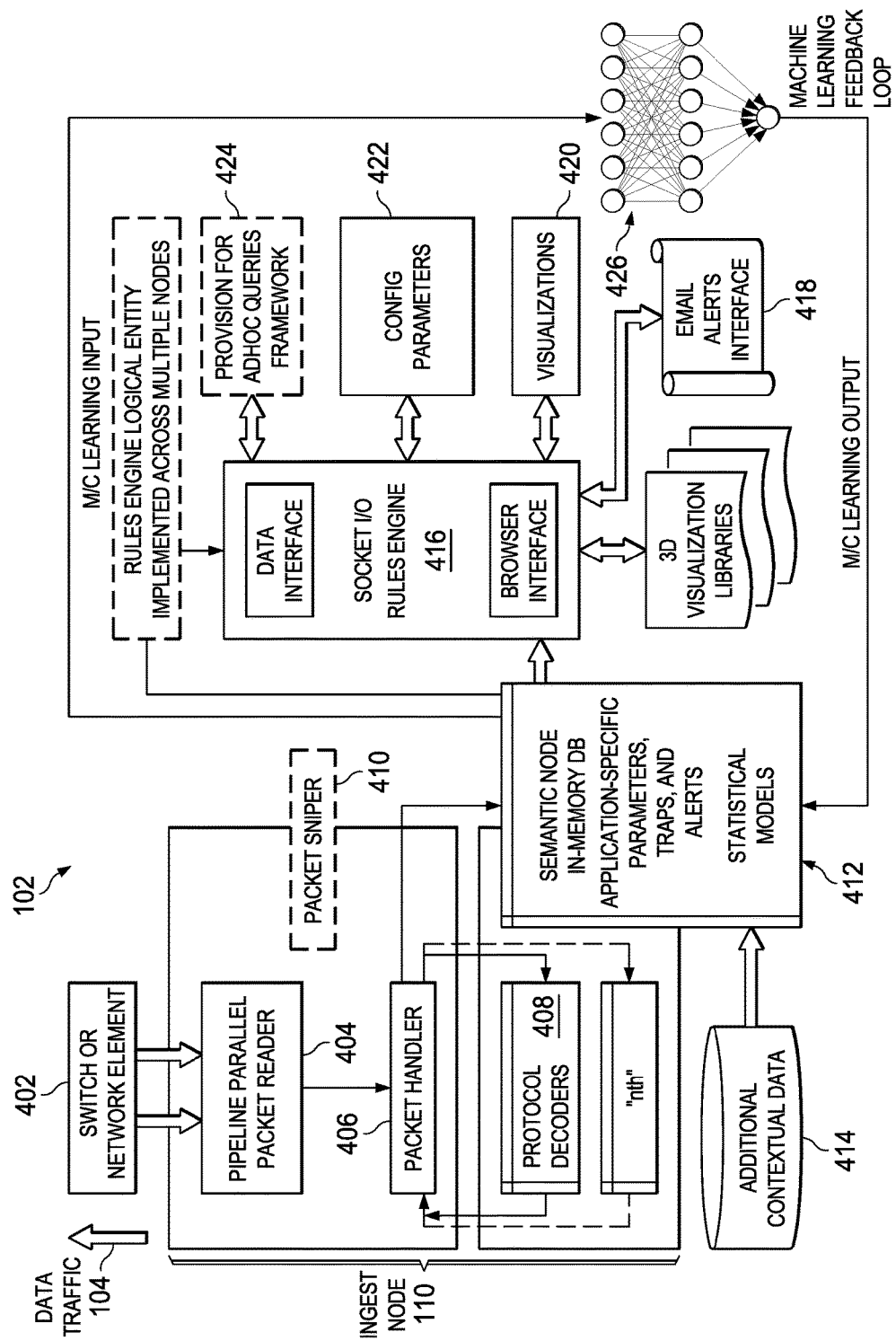
FIG. 4 is a system block diagram for a network live-data, real time data analysis system monitoring packet data transmissions.
Figure 5:
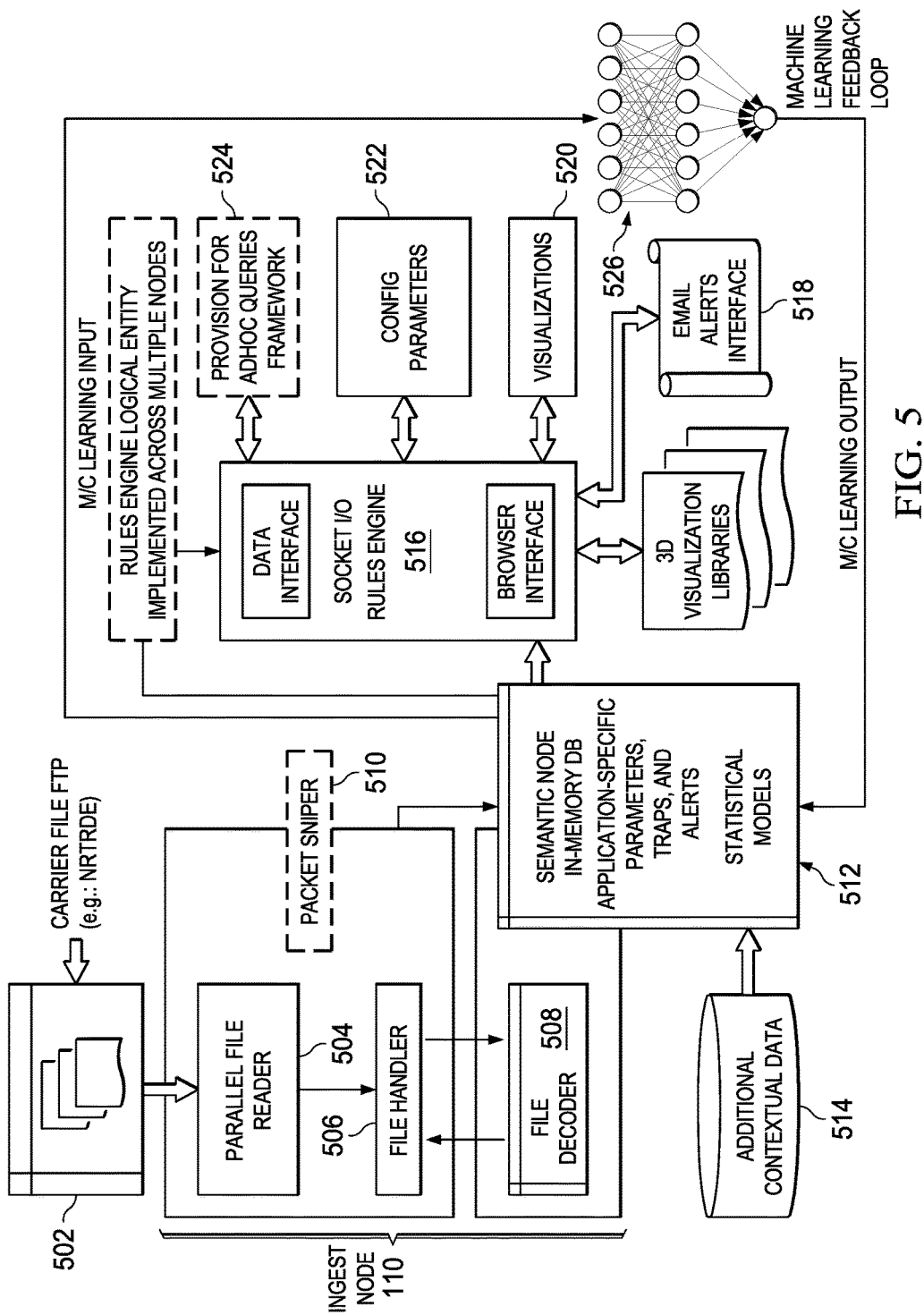
FIG. 5 is a system block diagram of a rework live-data, real time data analysis system for monitoring FTP file data.

Referring now to FIGS. 4 and 5, there are illustrated clock diagrams for implementation of the system withe a network packet data configuration (FIG. 4) and a FTP file based data configuration (FIG. 5). The System 102 causes application driven relational language processing situational analysis, deduction and resulting actions to be not limited to events that have happened, but to bring such situational analysis, deduction and resulting actions into operational real-time unity at the time of, and concurrent with, their live transmission. The System 102 therefore enables understanding and calculation of relevant actions to be taken to better affect a desired outcome before closure of that opportunity by the network traffic exiting the network to become a post event log record or stored data center application event.

Referring now to FIG. 4, there is illustrated a system clock architecture for the System 102 configured to monitor network traffic transmissions. The network traffic 104 passes through some type of switch, live-data source or other network element 402 that provides a port to mirror the data for ingestion. Within the ingestor node 110 a pipeline packet reader 404 ingests the mirrored network traffic 104 passing through the switch, live-data source or other network element 402 and reads all of the data passing therethrough. A packet handler 406 within the ingestor node 110 processes all of the packets and decodes the associated protocols of the packet using protocol decoders 408. A packet sniper 410 within the ingestor node 110 monitors for the occurrence of particular conditions or packet combinations as defined by the semantic node 112 use cases. The information monitored for by the packet sniper 410 is controlled by a semantic node and in-memory database 412 which provides application specific parameters, traps and alerts that are to be monitored for and provided by the semantic node 112.

This information may be monitored for using particular statistical models implemented within the semantic node and in-memory database 412 and may additionally use additional contextual data from outside databases 414. The information within the semantic node and in-memory database 412 controls the operation of a rules engine 416 that generates the appropriate responses to information detected by the packet sniper 410 and generates various responses thereto such as email alerts 418, visualization outputs 420, configuration parameters 422 and framework queries 424. Information within the semantic node and in-memory database 412 may also be updates through a machine learning feedback loop 426.

Referring now to FIG. 5, there is illustrated the architecture for the system 102 whereby a files server acts as a live-data source port mirror and transmits FTP files 502 to the ingestor node 110 for processing using a parallel file reader 504. The System provides a file handler 506 that processes the monitored files via a file decoder 508. The packet sniper 510 within the ingestor node 110 monitors for specific information and sends the file information to the semantic node 112 as per the System requirements.

In a method similar to that of the live-data network traffic ingest, the file-based information is also ingested, monitored and analyzed using particular statistical models implemented within the semantic node and in-memory database 512 and may additionally use contextual data from outside databases 514. The information within the semantic node and in-memory database 512 controls the operation of a rules engine 516 that generates the appropriate responses to information detected by the packet sniper 510 and generates various responses thereto such as email alerts 518, visualization outputs 520, configuration parameters 522 and framework queries 524. Information within the semantic node and in-memory database 512 may also be updated through a machine learning feedback loop 526.

The systems of FIGS. 4 and 5 provide the ability to bring application driven relational language processing situational analysis, deductions and resulting actions into operational real-time unity with network traffic while it is being transmitted within its associated network. Actions may then be taken on the Event to shape, truncate, alert or redirect before it exits the network and becomes a post Event fixed log, record or data center application event.

Figure 6A:
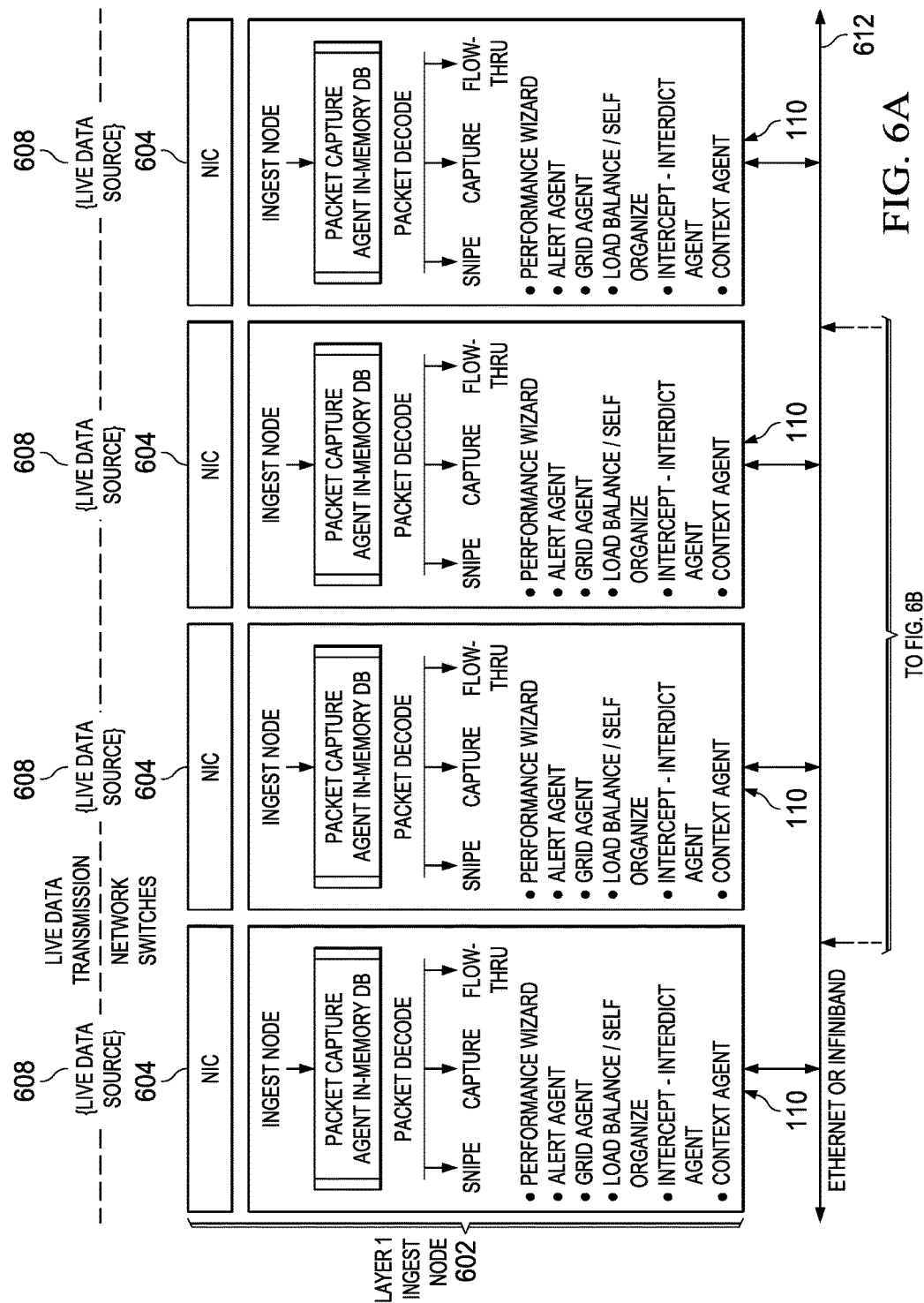
FIGS. 6A and 6B illustrate a function specific topology layered architecture of a network live-data, real time data analysis system.
Figure 6B:
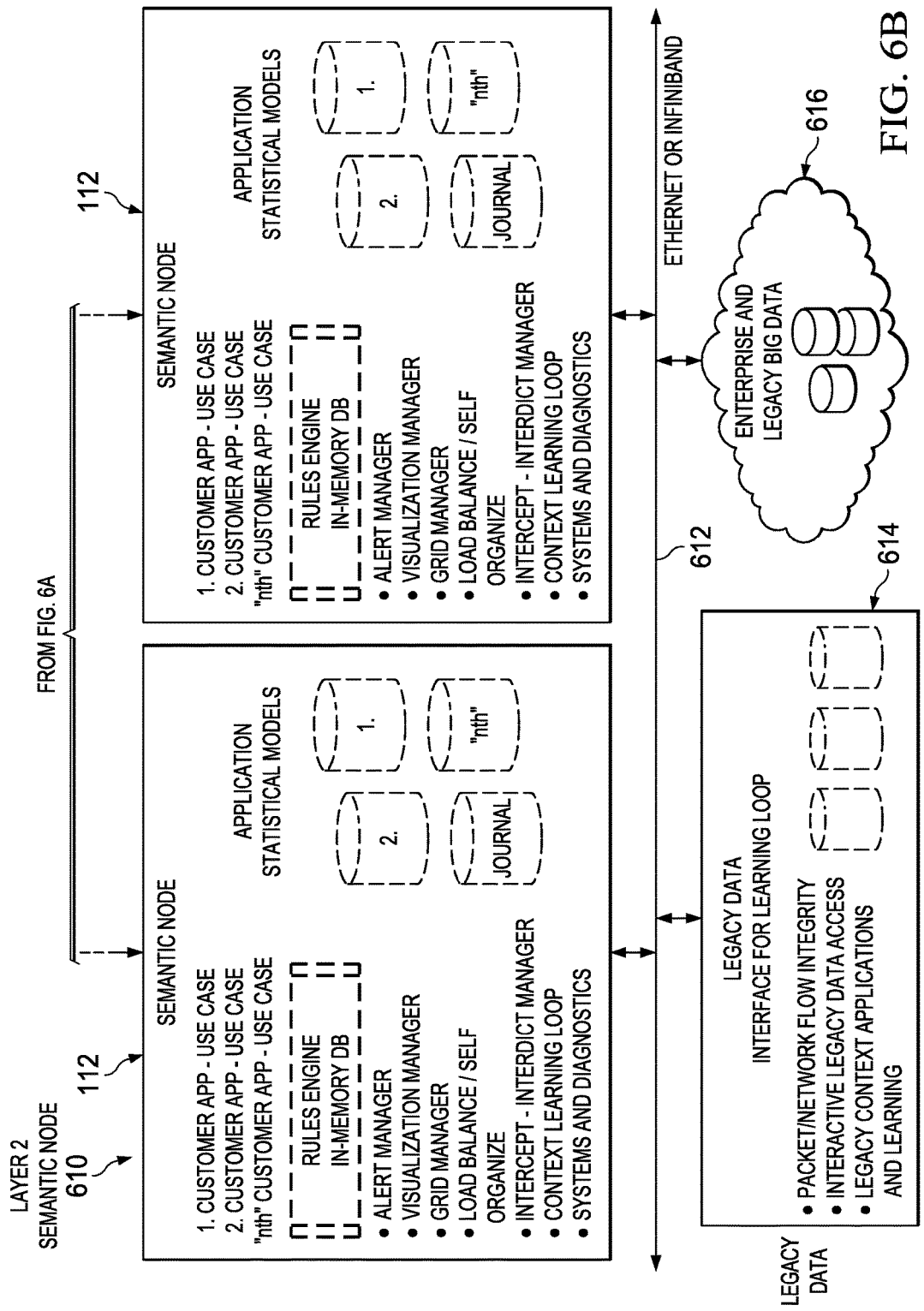

Referring now to FIGS. 6A and 6B, there is illustrated the configuration of the System 102 within a function-specific topology layered architecture. The first layer 602 composes the ingestor node 110. Each of the ingestor nodes 110 are connected to a live-data source 606 through an associated port mirror or network interface controller ("port mirror") 604 that provides the ingestor nodes 110 access to mirrored network traffic. Each of the ingestor nodes 110 connects to a second layer 610, which provides the semantic node 112. The semantic node 112 interconnects with the ingestor node 110 via an Ethernet or Infiniband connection 612.

The semantic node 112 in layer 610 contains the application decision matrices, self-learning cognitive decision support, and action logic to enable execution of the desired use case outcome. Each semantic node 112 contains the use case or pattern recognition logic to identify with instances and situations that are of interest in accordance with their use case. The semantic node 112 provides a contextual learning loop through an independent process 614 connecting to legacy storage 616 and providing updates to the semantic node 112 in parallel to the system 102.

Figure 7A:
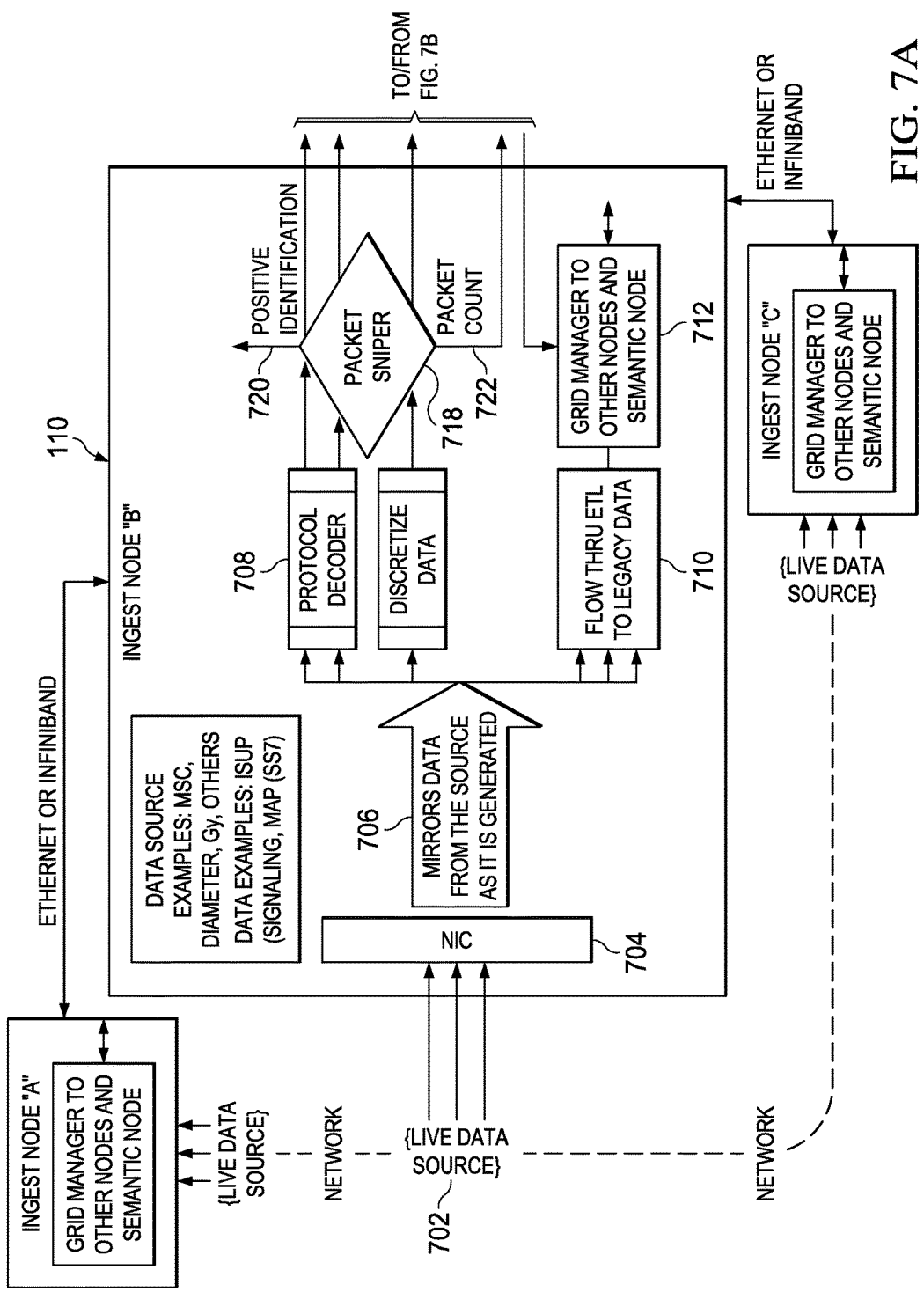
FIGS. 7A and 7B are functional diagrams of the ingestor node.
Figure 7B:
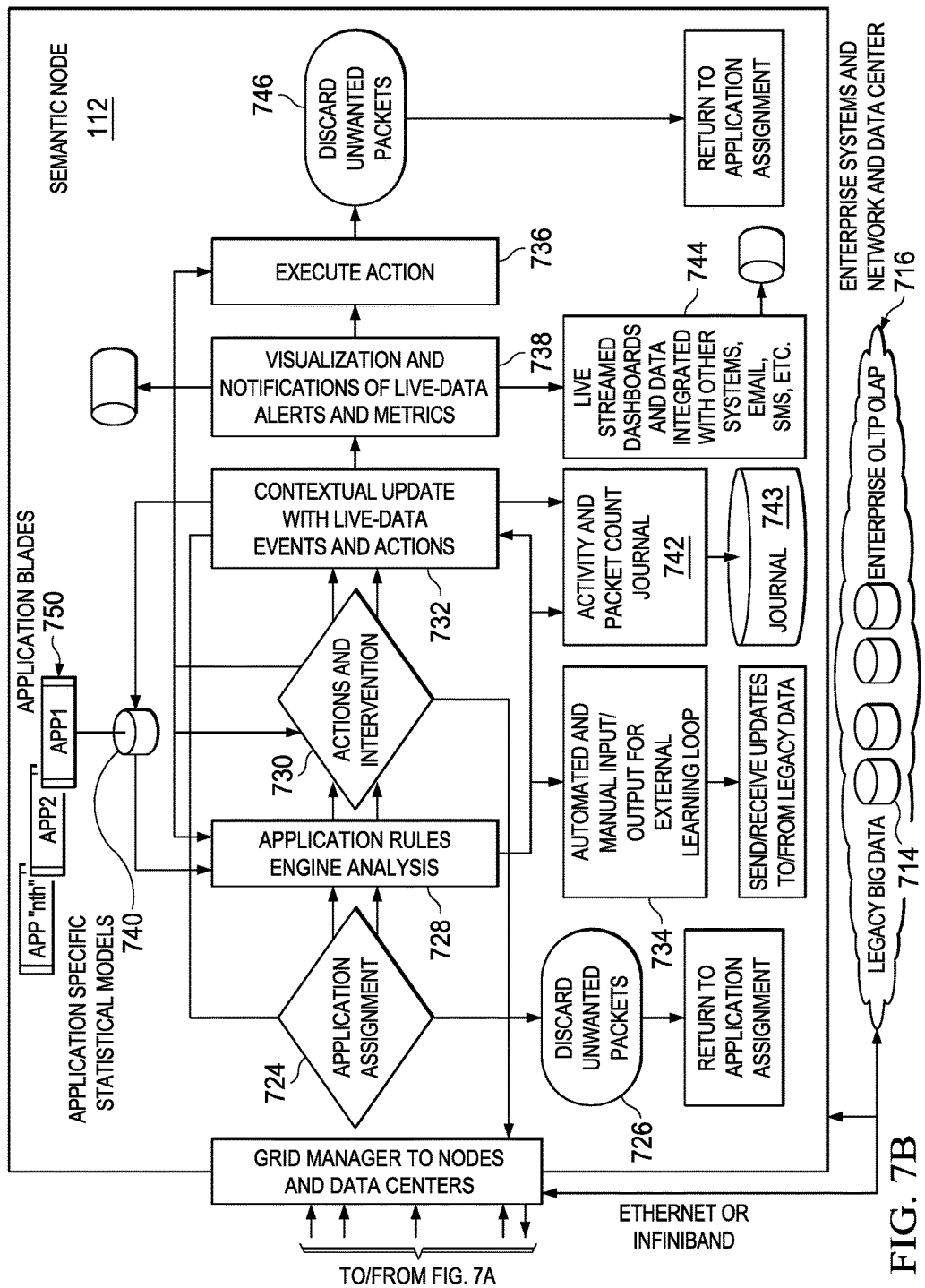

Referring now to FIGS. 7A and 7B, there is illustrated a functional block diagram of the methodology used for nonintrusive live-data ingest at the ingestor node 110 to the application specific situational analysis performed at the semantic node 1412. The process provides a relational processing language driven analysis for the stated applications to occur while the Event is still open by way of its transmission within the network, and thus provided the ability for real-time, dynamic relational processing language driven intercept, adjustment of content, prevention of action or interdiction to occur before the data exits the network and becomes a data center application event. This provides the opportunity to stop, shape, alter, copy, redirect or release the network activity while it is still in transit. The result is that the method allows for high data rate, high volume signaling data to be analyzed in real-time while it is still within the network so that certain enterprise policies, controls, predictive probability alerts, or other actions can be applied in real-time to the monitored data flow.

The live-data source provides network traffic (structured or unstructured) to the ingestor node 110 for decoding and identification. Upon ingestion by the ingestor node 110, the network traffic is sent to the protocol decoder 708 that decodes and identifies each wanted protocol packet and discretizes such wanted decoded network traffic as packets into a time dependent buffer ("TDB") as allocated by the time dependent buffer VM ("TDB VM") 908. The TDB VM 908 is a semaphore-based internal memory allocation manager for the ingestor node 110 that assists in the integrity of memory allocation and release to ensure that both locked and lockless operations can occur in parallel, in real-time as needed and without clash. This memory is allocated and distributed at arbitrary lengths, based on need (via a variable length bitmap). The address of each newly loaded TDB is passed to a process whereby prescribed or deduced events are looked for in packet sniper 718.

The packet sniper 718 compares the decoded data to certain conditions of interest as indicated by the prescribed rules provided by the semantic node 112 or by deduced conditions determined by the contextual data and feedback loop/learning loop undertaken by the semantic node 112. The packet sniper 718 provides positive indications 720 upon detection of these conditions. On completion of its search, each packet sniper 718 releases its previously allocated TDB to the ingestor node memory manager for use by other parallel current tasks or future operations that could be requested or introduced to the ingestor node 110. The TDB allows a no-lock, variable time latency multiprocessing of each packet by the ingestor node 110, and, the capability for locked operation in the eventuality of write functions being required to change the contents of the packets. The packet sniper 718 further counts the number of packets that are received from the decoder 708 and provides this as a packet count indication 722. The packet count 722 is used to verify live event network traffic flow with post event network traffic records, providing a network transmission integrity check for network operations. The packets of interest detected by the packet sniper 718 are referenced against an action table by the ingestor node 110 and such prescribed action is executed. Network traffic of interest is flagged and sent to the semantic node 112 for application based processing. Selected or all network flows to the application relevant filter 724 within the semantic node 112; these are provided for longer term storage or transferred to legacy data or discard 726. Relevant network traffic is passed to the application rules engine 728 for further analysis to determine the actions required based upon the detected data.

The application rules engine 728 initiates particular actions and interventions 730 in accord with each application use case deduction and initiates the desired analytic outcome(s). The application rules engine 728 may also provide information to enable contextual updates with live-data events and actions at 732, in addition to the ability to enable manual input/output as part of the learning loop at step 734. The determined actions and interventions at 730 drive contextual updates with live-data events and actions that occur at 732. The actions and interventions 730 are used to execute particular actions at 736 or to provide information to the grid manager 712 within the ingestor node 110. The contextual update with live-data events and actions at 732 enable the creation of visualization and notifications of live-data alerts and other metrics to provide necessary notifications at step 738. The contextual update with live-data events and actions 732 also provides information for storage and application specific static and dynamic statistical model 740 and provides information to the activity and packet count journal 742. They also enable adjustment to the conditions, rules and actions which are passed back to ingestor node 110 and packet sniper 718 to provide dynamic and deducted additions to those prescribed by the use case. The visualization and notification of live-data alerts and other metrics execute an action at 736, or alternatively or additionally, enact live output to dashboards or data integration with other systems such as email, SMS, etc., at 744. After the executed actions at 736 are caused to occur, unwanted packets are discarded at 746. Information generated responsive to the activities are stored within the packet count journal 742.

Each use case provides the control information that controls the operation of its respective processes within the semantic node 122 and ingestor node 110. Each blade 750 may be associated with a particular use case such that a particular condition or operation may be monitored and detected by the ingestor node 110 and semantic node 112. Multiple blades 750 may be utilized such that different use cases may be implemented by the system 102 on the same network traffic 104 in parallel in a multithreaded fashion.

Figure 8:
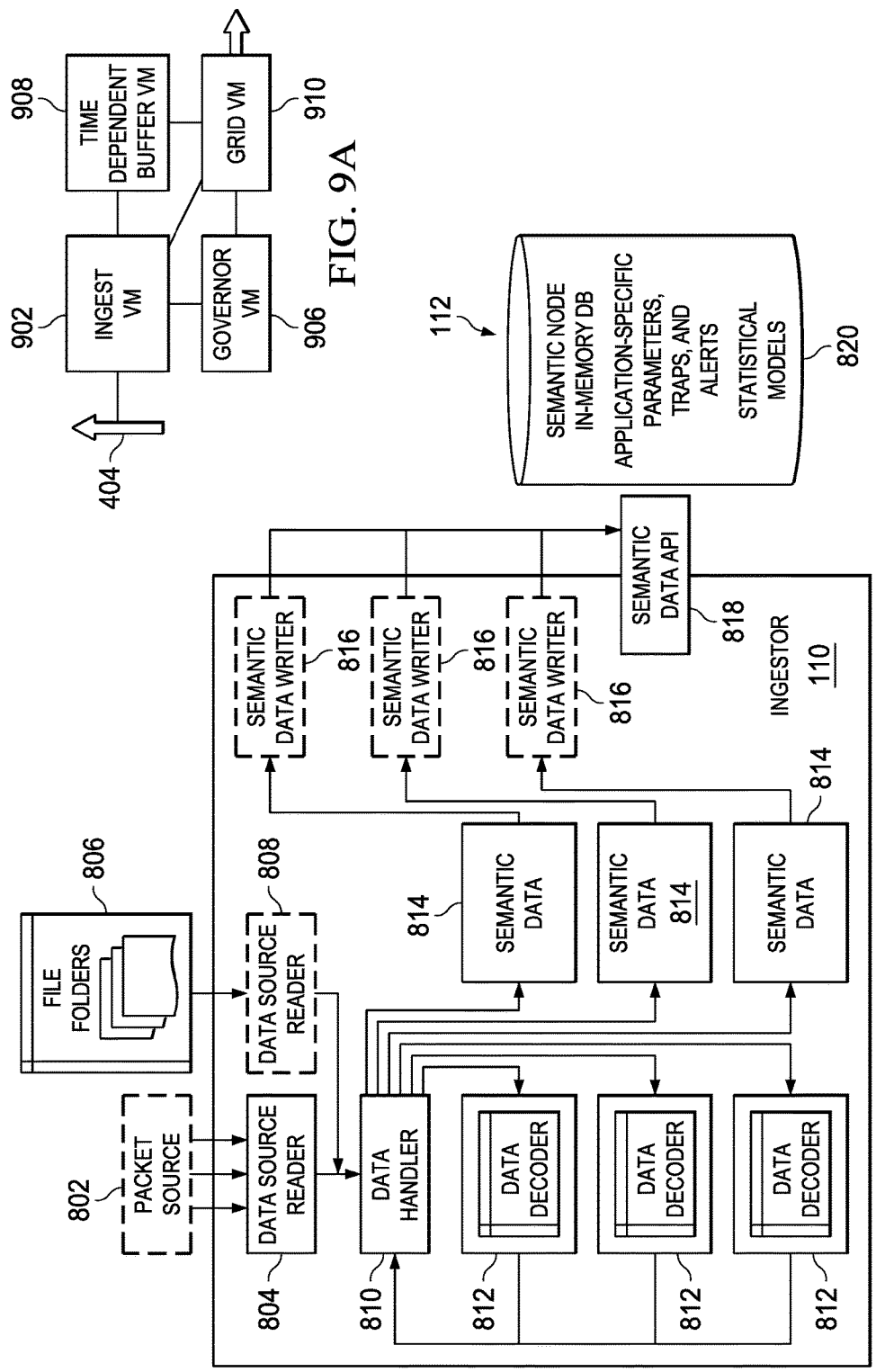
FIG. 8 illustrates the topical data flow through an ingestor node and semantic node.

Referring now to FIG. 8, there is illustrated the topical data flow through the ingestor and semantic nodes. A packet source 802 is associated with a particular network traffic and may be read by a live-data source reader 804 within the ingestor node 110. Additionally, various files 806 may be read by a live-data source reader 808 configured for reading files. Reading data from 802 and 806 can be enacted simultaneously. The data read by the data source readers 804 and 808 are processed by data handlers 810 which utilize a number of data decoders 812 in order to decode data from the various data readers 804 and 808.

The data handler 810 generates various sources of semantic data 814. This data is provided to a semantic data writer 816 so that it may be written to a semantic data application program interface 818. The API 818 provided that data to the semantic node and in-memory database 820 that contains application specific parameters, traps and alerts that are generated responsive to various statistical models relating to received Events within the semantic node 112. Various alerts and reports are generated responsive to the semantic node and in-memory database 820 operations.

Figure 9A:
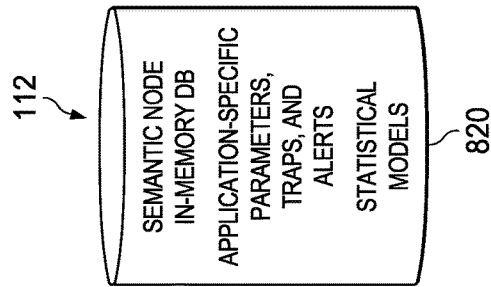
FIG. 9 is a block diagram of an ingestor node.
FIG. 9B is a flow diagram of simultaneous processing of data packets within an ingestor node.

Referring now to FIG. 9A, there is more particularly illustrated a block diagram of the various virtual machine functions that make up the ingestor node 110. The primary functions of the ingestor node 110 are to attach the System to a live-data source for the purpose of receiving mirrored data from that source, then decoding and preprocessing before forwarding to the semantic node 112. The ingestor node 110 attaches to the live-data source through a live-data source port mirror or other non-intrusive method that enables access to data as a "parallel observe and duplicate" process and not by being a network element step of "pass through-stop-copy-forward". Each ingestor node 110 is able to directly communicate with its peer nodes in a grid, and with an assigned semantic node 112. The ingestor node 110 feeds information to its assigned semantic node 112 for use case application analysis and deduction. The ingestor node 110 provides peer-to-peer communications.

The ingestor node 110 consists of four agents able to operate independently and in parallel: 1) the ingest VM 902, 2) the governor VM 906, 3) the time dependent buffer (TDB) VM 908 and 4) the grid VM 910. The ingest VM 902 ingests the mirrored network traffic, undertakes protocol decoding, acquired a TDB, and discretizes and writes the required packetized data to the assigned TDB. The protocol decoder process within the ingest VM 901 uses an informational map that the ingestor node 110 uses for the dynamic allocation of threads and cores to decode one or potentially more protocol packets in parallel.

A network packet may contain multiple protocols. For example, an internet protocol (IP) packet may include web traffic (HTTP), mail (SMTP), internet phone (VOIP), file transfer (FTP) and network monitor (SNMP), amongst others. When the protocol decoder tells the ingestor node 110 to decode HTTPs, SMTP, FTP protocols, the protocol decoder collects information on both the sender and the target servers. The ingestor node 110 allocates three threads each operating on its assigned protocol and all three threads run in parallel to more readily operate on the packet. The design of the protocol decoder is lockless and a read-only operation. As an example, a decoded packet within a TDB VM 908 could be analyzed by three or more protocol decoders independently in parallel and with no fixed ordering. Thus, the HTTP decoder would perform a bit-comparison to determine if there were an HTTP page request within the packet, retrieve the target server name, and place the information within the semantic data queue. The SMTP decoder would perform a bit comparison to determine if there were an SMTP send mail within a packet, retrieve the mail server name and sender, and place the information within the semantic data queue. The FTP decoder would perform a bit comparison to determine if there were an SMTP PASV within the packet, retrieve the mail server name, and place the information within the semantic data queue. Each protocol decoder would independently release its use of its allocated TDB VM 908.

The ingest VM 901 also includes one or more packet sniper 718 process(es) for providing multi threaded parallel comparisons for prescribed or deduced conditions. The packet sniper process also includes the information that the ingestor node 110 uses for allocation of threads and/or cores to analyze per data type along with where and/or how to generate alerts to the semantic node 112. Similar to the protocol decoders, multiple packet sniper processes can be enacted on any assigned TDB, each process releasing its interest in the TDB when finished. The conditions being sought by packet sniper processes are set up by the semantic node 112 or may optionally be established by direct input to the ingest VM 901. The ingest VM 902 is also able to simultaneously transmit selected or all data to the semantic node 112.

In one example, a decoded SS7 packet contains the phone number of a caller and the phone number of a call receipt. To address the requirement of alerting when caller (1234567890) makes calls to any number, and to alert when called number (1900PREMIUM) received calls from any number, the packet sniper configuration tells the ingestor node 110 of these two separate operations with respect to an outgoing sniper and an incoming sniper. The ingestor node 110 allocates two packet snipers, each operating on its assigned task and within its own in-memory database or assigned TDB VM 908. Each thread runs in parallel and independently with no fixed ordering and will operate on a decoded packet. When the outgoing sniper matches the caller number to a caller blacklist in its in-memory database, an alert will be generated. Similarly, if the incoming sniper matches a called number to a called blacklist within its memory database, the packet sniper generates an alert. Packet sniper will independently release use of its TDB VM 908.

The governor VM 906 acts as a performance watchdog with the ability to organize core and/or memory availability of the ingest VM 902 responsive to its detected conditions. The dynamic allocation and release of multiple TDB VM 908 allows multiple functions of disparate timing to be scheduled by the ingest VM 902 so that optimum memory availability is provided to those functions. The TDB VM 908 provides the ingestor node 110 with the ability to use memory efficiently in concert with the speed of ingest and any disparate ingestor node 110 processing. The TDB VM 908 uses a combination of semaphores and arbitrary memory mapping dynamically responding to allocation of memory requests. The TDB VM 908 allows for the efficient use and tuning of memory based upon time required and size needed. Multiple ingestor node tasks and VMs are able to request workspace of varying need and time. TDB VM 908 flags the required memory blocks. These can be flagged as a lock or no lock status. The flagged memory can then be used in parallel by multiple tasks in read only mode, and dynamically locked if in write mode. Each task released its need for the memory block on completion of its task. The final release will release that memory block back to the TDB VM 908 for further use. TDB VM 908 is able to allocate as a single block of memory non-contiguous blocks grouped as a virtual contiguous allocations of memory.

Figure 9B:
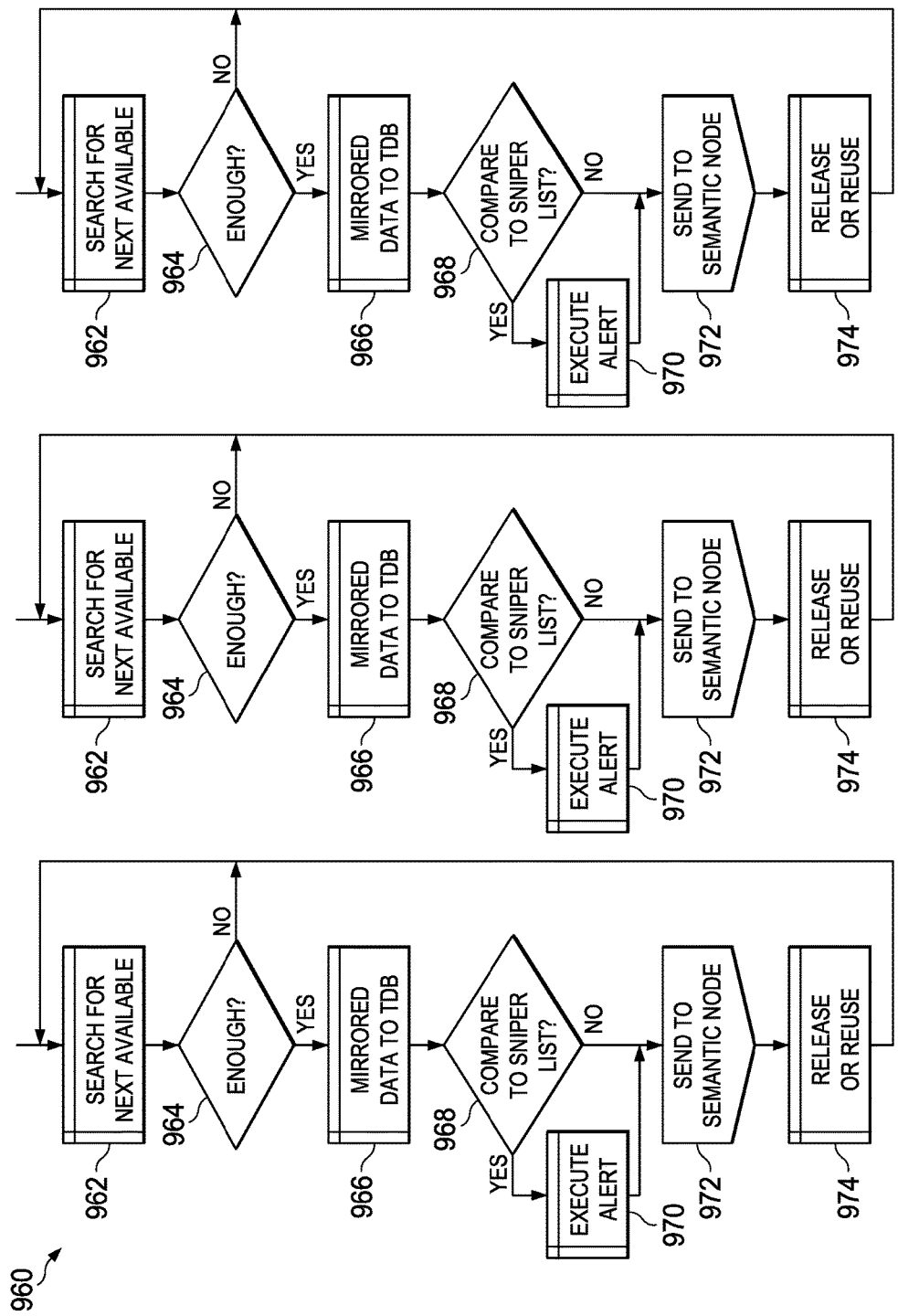

This memory management is illustrated for three simultaneously operating processes in FIG. 9B. FIG. 9B illustrates four separate tasks 960 that are occurring in parallel within the same TDB as allocated by the TDB VM 908. The processes search for the next available data packet at step 962 for decoding. Step 964 checks if all packets have been received and if not, control passes back to step 962 to get the next packet for decoding. As packets are decoded and identified they are placed into requested TDBs. Control passes to step 966, and the addresses of buffered packets are passed to the packet sniper or other ingest VM 920 tasks. Packet sniper 718 analyzes the buffered data comparing it for triggers of interest to its sniper list at step 968 to determine if any relevant conditions are detected. If a trigger is detected, an alert is executed at step 970 and in parallel any recorded action beyond a trigger is also executed. If not trigger is detected at step 968 or following an alert or action executed at step 970, the contents of the data packets are forwarded on to the semantic node 112 at step 972 and that interest in that TDB memory is released by packet sniper back to TDB VM 908 at step 974. An action at step 970 could be to change the contents of that packet content, or to alert a network operations center to truncate the transmission of that Event, or to trigger other events that may or may not activate intercept or interdiction processes. As can be seen, the same data packets can be monitored in three separate use cases 960 that are each monitoring for different types of information in the same manner. Governor VM 906 monitors the timeliness of disparate use cases as to their use of the same memory buffer for different purposes in relationship to the overall memory available for allocation by the TDB VM 908.

Figure 10A:
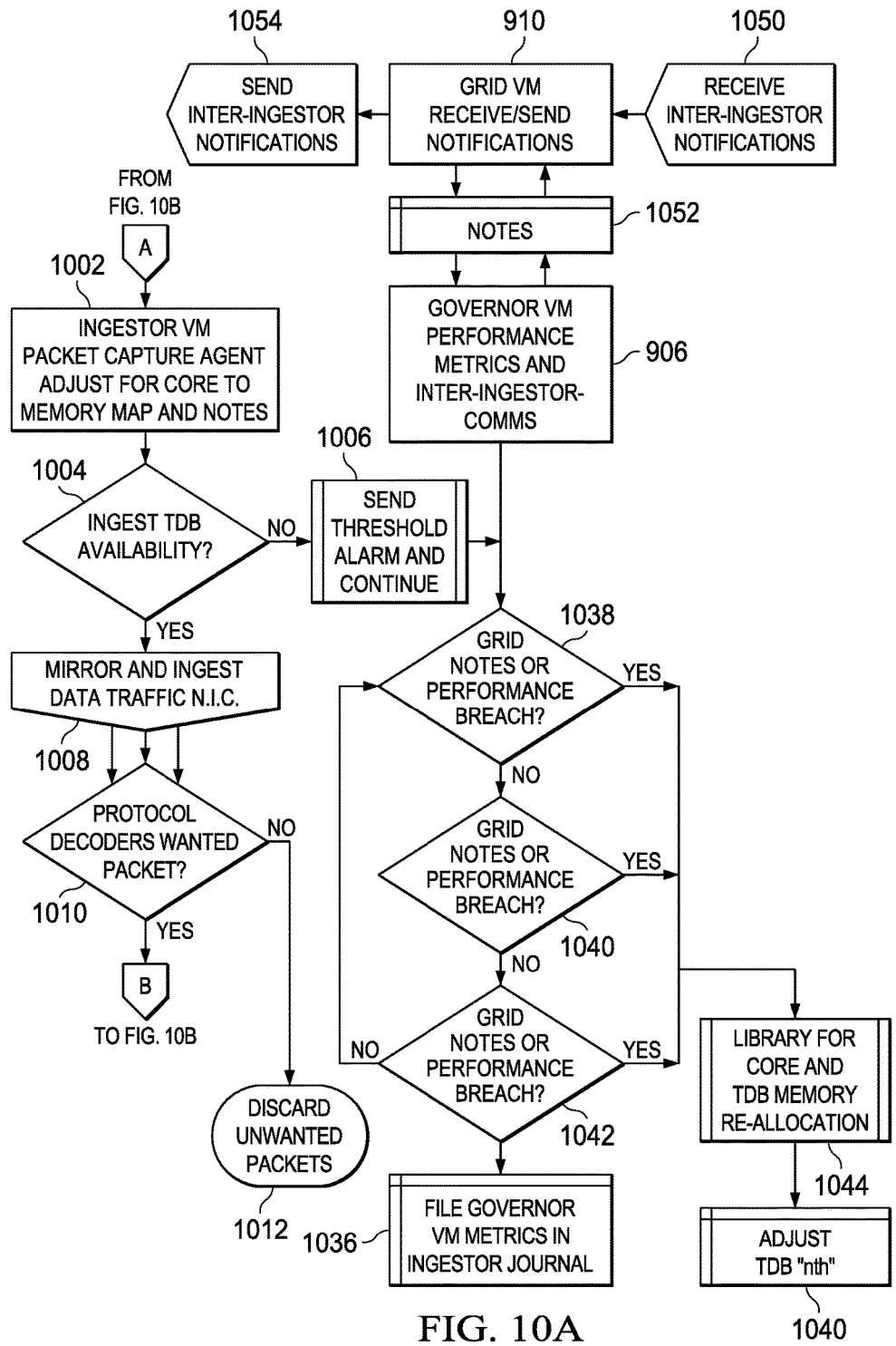
FIGS. 10A and 10B illustrate the process flow of an ingestor node.
Figure 10B:
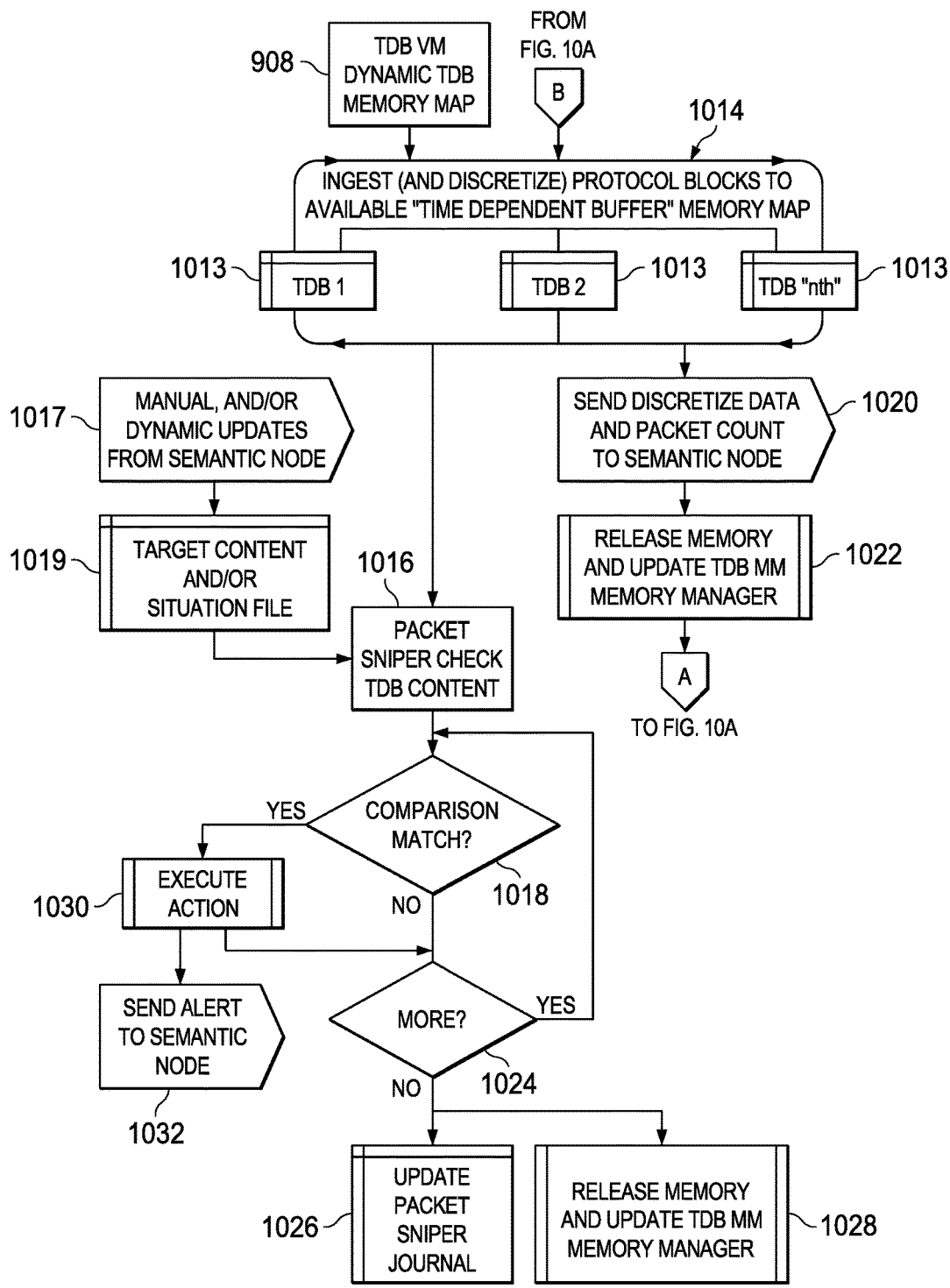

Referring now to FIGS. 10A and 10B, there is illustrated the process flow of an ingestor node 110 with respect to each of the virtual machines described herein above. The ingest VM 902 uses a packet capture agent at 1002 to allocate available cores and request allocation of TDB 1013 from the TDB VM 908. If a TDB 1013 is not available, threshold alarm is generated at step 1006. If a TDB 1013 is available, the mirror of the network traffic is copied and processed at 1008. Protocol decoders at 1010 ingest the mirrored packets to determine if the packets are wanted. Unwanted packets are discarded at step 1012.

Thus, from the port mirror to the network traffic can be copied (in parallel to its transmission) into one or more of the allocated TDBs 1013 and made available to one or more of assigned scheduled cores of the ingest VM 902 and, by using variable bitmap searching, the required protocols are decoded and recognized, or the required patterns are recognized at step 1010. The address of TDBs 1013 containing wanted protocols/packets/patterns are passed to packet sniper 1016 and other such tasks for further processing or inspection. The TDB VM 908 process monitors the availability of memory blocks and presents the available status to the ingest VM 902. The ingest VM 902 schedules the sending of the ingested data to the semantic node 112 in parallel scheduling routines through the pack sniper 1016 that compares data for preselected alerts or actions at inquiry step 1018. Once a TDB 1013 is fully released and its contents transmitted at step 1020 to the semantic node 112, the now available TDB addresses are returned at step 1022 to the TDB VM 908 memory map as being available. Control will then pass back to step 1002.

If the packet sniper 1016 does not detect a comparison match at inquiry step 1018, control passes to step 1024 to determine if different content exists. If so, additional comparisons are performed at step 1018. If no further comparison data is available, control passes to steps 1026 and 1028 wherein the packet sniper journal is updated at step 1026, and the memory associated with the compared data is released and the SDB VM 908 memory map updates at step 1028. The TDB VM 908 does not clear buffers for use until every task has issued a clear status on that TDB 1013.

Packet sniper 1016 is engaged when each ingest VM 902 has completed its loading of live-data from the allocating core. The packet sniper 1016 is responsive to dynamic or deduced updates received from the semantic node at 1017. This update information 1017 enables the packet sniper 1016 to target particular content and/or situations. This information is stored within a target content and/or situation file 1019 that controls the operation of the packet sniper 1016. Packet sniper 1016 analyses the contents of the TDB 1013 for content or conditions that have already been determined as being of interest at inquiry step 1018, as well as updated deduced conditions from step 1019. If found, packet sniper 1016 performs predetermined action triggers at 1030 that can either execute within the ingestor node 110 or defer to the semantic node 112. If inquiry step 1018 determines that a match does exist, the action associated with the match is executed at step 1030 and an alert is generated to the semantic node 112 at step 1032. Packet sniper 1016 will then continue its searches at step 1024.

The role of the governor VM 906 is to monitor and maintain the preset performance levels of core usage and memory space available to all virtual machines and tasks within their host ingestor node 110. Assigned cores that operate at a higher percent busy value or excessive memory usage cause an alarm to be set to the semantic node 112 for diagnostic records and alerts.

The governor VM 906 measures the time periods of the ingestor node 110. This comprises measuring the time taken for the TDB VM 908, the packet sniper(s) and other tasks to complete their operations, and additionally, ensuring that memory usage is not growing beyond a certain threshold. The governor VM 906 operates in parallel to all of the other virtual machines in the ingestor node 110 and engages dynamic performance balancing of available cores and memory should processes start to encroach on preset or dynamically set hurdles. The performance gathering data of the governor VM 906 is logged and sent at regular intervals to the semantic node 112 for journal entry at 1036. The governor VM 906 also acts as the entry point for executing messaging from the grid VM 910 and command and control functions from the assigned semantic node 112. The governor VM 906 determines at inquiry steps 1038-1042 whether there has been a grid VM 910 condition set or an internal performance breach. When a grid VM 910 condition or performance breach is detected, the governor VM 906 undertakes reallocation of priorities and resources as provided by the resident operating system and utilities at step 1044 and at step 1046. Governor VM 906 undertakes similar actions when receiving command, control, update, or diagnostic instructions by the assigned semantic node 112.

As a result of a threshold alarm, the governor VM 906 commences working with the operating system and TDB VM 908 to reassign other cores and memory of a lower priority and to allocate the newly-available resources to assist in reducing the workload of other cores. Thus, in a situation where cores running ingest or decode or packet sniper tasks approached a set threshold level of, for example, 70% and, or, the amount of available memory for allocation to those tasks in the TDB 1013 also reached a threshold level of, for example, not less than 20%, the governor VM 906 would a) attempt to reassign or cease lower priority work, b) attempt to increase available memory in the TDB 1013, and c) inform the assigned semantic node 112 of the condition.

The role of the grid VM 910 is to manage for its host ingestor node 110 the intercommunications between peer ingestor nodes 110, and thereby the intercommunications between multiple semantic nodes 112. Based on use case performance requirements it is possible to configure any number of ingestor nodes 110 and semantic nodes 112 into an analytical grid architecture. Thus, the grid VM 910 receives inter-ingestor node notification at 1050 and make notes of these indications at 1052. The grid VM 910 is also able to send notifications to other ingestor nodes at 110 and 1054. The data within the grid VM 910 is referred to as map of operations and contains a role both within the grid and within the node. The grid VM 910 enables notification of dynamic conditions and required action among various ingestor nodes 110 within a set of Systems 102.

Figure 11:
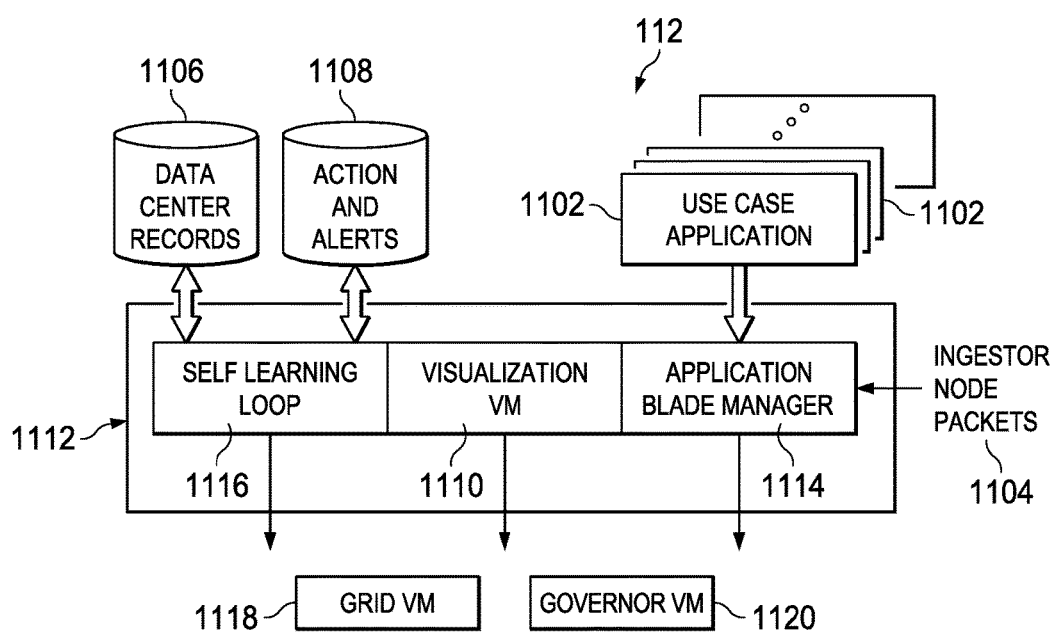
FIG. 11 illustrates a block diagram of a semantic node.

Referring now to FIG. 11, there is more particularly illustrated the semantic node 112. The semantic node 112 provides a use case application environment for time-critical situational analysis, contextual deduction, decision support and follow up action as dictated by the use case applications 1102 defined within that semantic node 112, working within a required window of time set by the application in regard to any desired result remaining relevant to its opportunity to effect change or alert. The semantic node 112 is able to inform other network elements or outside data processing environments of conditions within the System and additionally request or send determined intercept or interdiction commands that are in accord with the application.

The semantic node 112 provides a framework for time-critical situational analysis, decision support deduction and action processing of multiple use applications 1102 with regard to the live-data packets 1104 sent by the ingestor node 110. In some cases this may require the use case application to access various other data such as legacy data center records 1106 or to send alerts or to seek action that may require the servicing of the use case application's needs to include non live-data access to data storage outside the System 102.

The decision accuracy and situational relevancy of semantic node 112 is continually updated through the recording of actions and alerts within the actions and alerts database 1108. The actions and alerts are deemed to be correct/non-correct through programmatic access to data center records 1106 and the subsequent reformulation of statistical subject matter used in decision support situational analysis. The semantic node 112 consists of three processes that operate dynamically and independently to form the rules engine 1112. These include the application blade manager 1114, visualization VM 1110 and self-learning loop 1116. A semantic node 112 further included two virtual machines (agents) including a grid VM 1118 and governor VM 1120. The grid VM 1118 and the governor VM 1120 operate in the same fashion discussed herein above with respect to the ingestor node 110 and provide the same functionalities. Queries to the semantic node 112 can be dynamically and programmatically executed responsive to use case application 1102 control or may also be learned through matrices input and defined or external machine (big data) input, including statistical models and pattern recognition.

The visualization VM 1110 provides the framework to drive dashboards (visual analysis tool or data presentation media) reporting in real-time to the activities being undertaken or their results, and provides an operational command and control entry point to the System 102.

Figure 12:
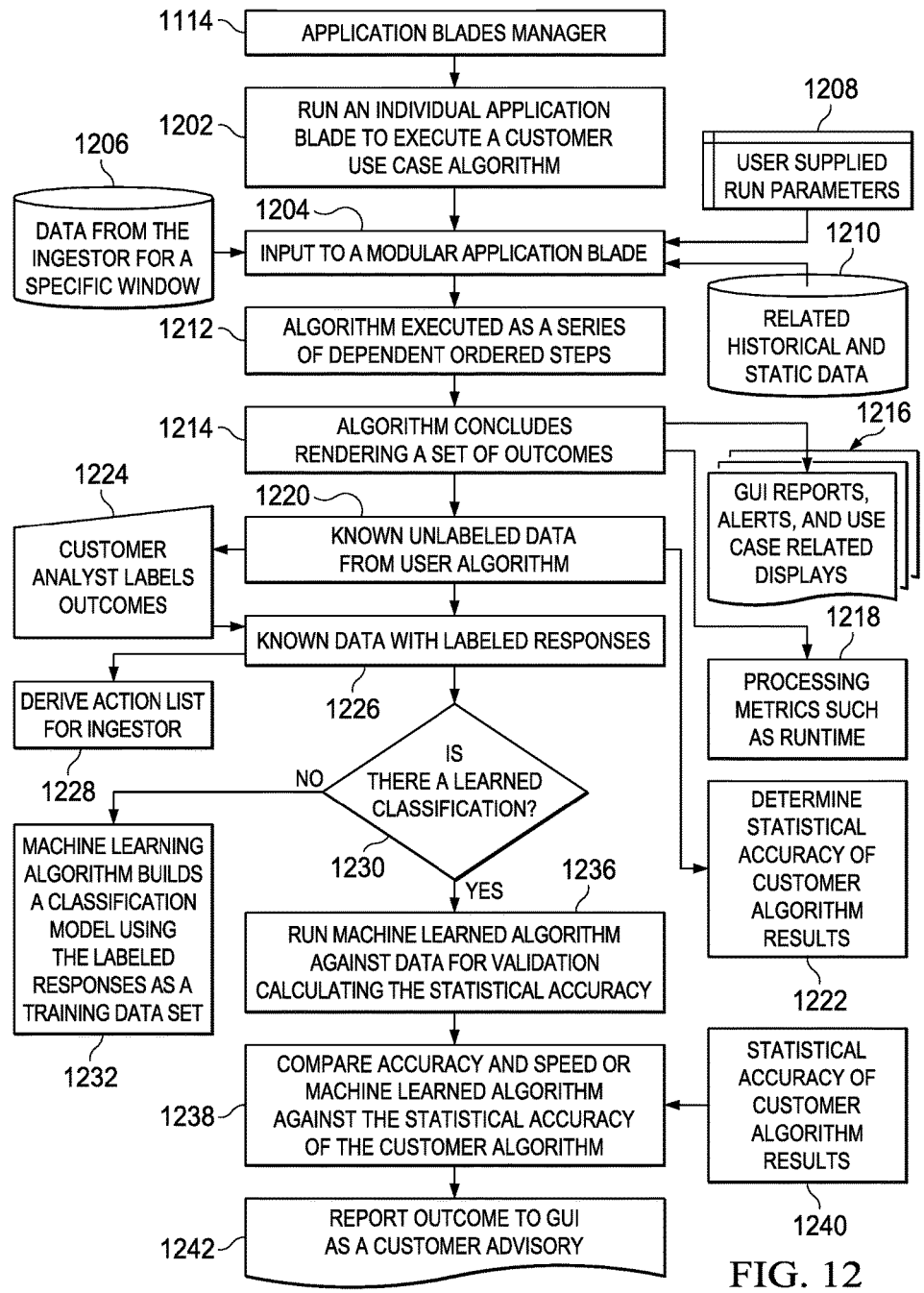
FIG. 12 illustrates the operation of an application blade manager.

Referring now to FIG. 12, there is illustrated a manner of operation of an application blade manager 1114. The application blade manager 1114 is responsible for managing and providing control based upon the various use case applications 1102 defined in use case application blades within the semantic node 112. The application blade manager 1114 runs at 1202 an individual application blade associated with a use case application 1102 to execute the customer use case algorithm. Input to the modular application blade is received from the process at step 1202 from data provided from the investor node 110 for a specific window 1206, from user supplied run parameters 1208 and from related historical and static data 1210. Each of these is received as input to the modular application blade a step 1204. Next, at step 1212, the use case algorithm is executed as a series of dependent ordered steps using the provided data. The algorithm concludes at step 1214 rendering a set of outcomes. These outcomes may be used to provide GUI reports, alerts and use case related displays on a dashboard as indicated at 1216. Additionally, the outcomes may be used to provide processing metrics at run time at 1218. Finally, the outcomes may provide at 1220 known, unlabeled data from the user algorithm.

This known unlabeled data may be used to determine the statistical accuracy of customer algorithm results at step 1222 or provide customer analyst label outcomes at step 1224. The customer analyst label outcomes may promote known data with labeled responses at step 1226 which may be used to derive an action list for the ingestor node 110 at step 1228. Inquiry step 1230 determines if there is a learned classification algorithm based upon the labeled responses. If not, the machine leering algorithm builds a classification model using the labeled responses as a training data set at step 1232. If so, the machined-learned algorithm is run against data for validation to calculate the statistical accuracy at step 1236. At step 1238, a comparison of the accuracy and speed of the machine learned algorithm against the statistical accuracy of the customer algorithm mas be based upon the result from step 1236, and the statistical accuracy of customer algorithm results at step 1240. All this information is used to generate a report outcome to the graphical user interface as a customer inquiry at step 1242. Additionally, this outcome is used to calculate the deduced conditions which are provided back to the ingestor node 110 and packet sniper 1016.

Figure 13:
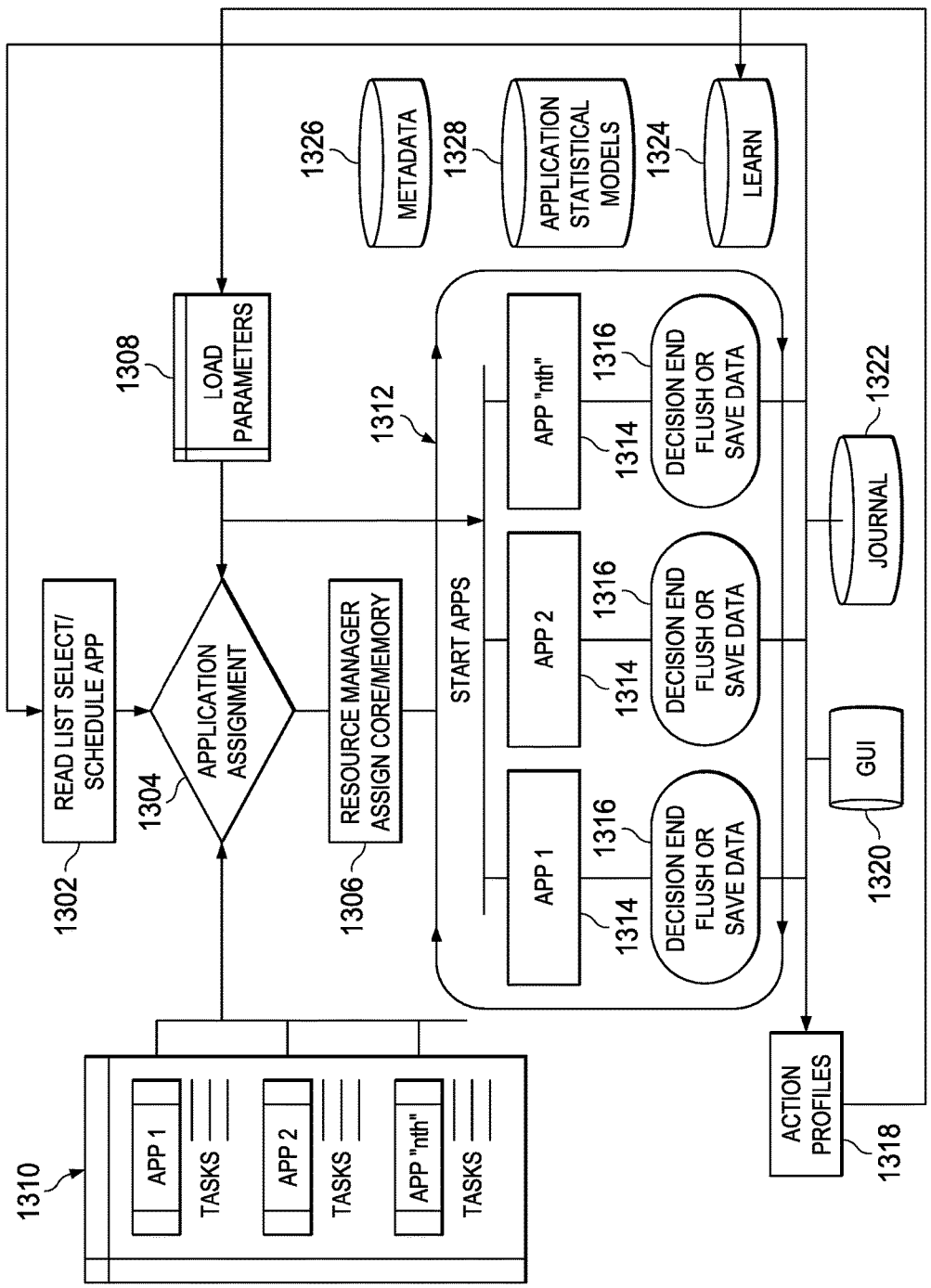
FIG. 13 illustrates the operation of a semantic node user application blade.

Referring now to FIG. 13, there is provided an illustration of the operation of a semantic node 112 user application blade. A particular application blade is selected at step 1302, and the associated information related to the blade is read. Next, an inquiry step 1304, the applications assigned to the use case application are determined. The assigned application information is forwarded to the resource manager 1306 to assign the core/memory requirements necessary for executing the application. The application assignments are based upon load parameters 1308 that are provided to the application assignment process 1304 and selected from the number of available applications 1310 that may be utilized. Each application 1310 has various operational tasks associated therewith. The resource manager 1306 will start the selected applications at 1312. The started applications may comprise any number of applications 1314 and execution of the applications will generate a decision to either flush or save data that is being analyzed by the use case application at 1316. These decisions to flush or save data are provided to action profiles 1318 that identify particular actions to be taken depending upon the decisions made by the applications 1314. Additionally, the decisions 1316 may be provided to a graphical user interface 1320 for display of information in the form of alerts or other dashboard activities or the information may be stored within a journal 1322 for later or further analysis. The action profile information 1318 may be forwarded to the load parameters block 1308 for further action or stored within a learning database 1324. The various applications 1314 that are implemented may utilize information from existing databases such as metadata 1326, applications statistical model 1328 or the learning database 1324.

The system described herein about with respect to FIGS. 1-13 may be implemented in a number of manners in order to provide real-time monitoring of live-data flowing through such associated live-data sources and other network elements. Various applications in which the methodology may be utilized include business assurance applications, customer experience applications, network operations applications and network security applications. Various business assurance applications include ways for monitoring and confirming that a business model implemented by a system is operating in an known and desired manner. These applications include international roaming fraud, Wangiri inbound calls/text messages (SMS), international revenue share (country or number callout) fraud, SMS fraud, SMS spam whitelisting, SLA (service level agreement) verification, shared services fraud management monitoring, shared services fraud threat aggregation and alerting, M2M (mobile to mobile) usage fraud monitoring, SIM (subscriber identification module) cloning, interconnect bypass (SIM box) usage fraud, phishing/farming, stolen device/IMEI (international mobile equipment identity) hotlist, femto call fraud detection, subscriber fraud detection, mobile payment system monitoring, content distribution SLA monitoring, network event verification for revenue assurance, real-time margin calculations for subscriber profitability, interconnect charges verification, PBX/corporate account hacking, mobile banking/2-Factor authentication fraud detection, mobile churn protection/head-off.

This methodology may also be utilized in a number of applications for controlling and managing customer experience. These include things such as bill shock management, social network analysis for churn avoidance, identification of non-optimal network conditions and immediately notifying or offloading subscribers for amelioration, high-value subscribers and the provision of granularized service to them for things such as dropped calls, wireless offloading for congestion, dynamic notifications for network outages, All-You-Can-App (customized tariff plans based on personalized application usage), and social network analysis for individualized experiences.

With respect to network operations applications, the system methodology can provide an intelligent network planning to prioritize/plan/optimize investments ahead of a demand curve, provide subscriber-centric wireless offload based on contextual intelligence provide congestion control at the granular level, provide core instrumentation and alerting, provide traffic management, provide instrumentation for circuit measurements, detect silent/dropped calls, calculate answer ratios, real-time control and alerts and to provide for data session quality-of-service monitoring and control. In one example, the System 102 receives outage plans for cell towers and commences monitoring in conjunction with a live-data source the presence, movement and activities of such mobile devices or devices within that nominated cell tower transmission area. A file is built in real-time to that monitoring and a usage map is dynamically built. The map is used to selectively alert through SMS, email, or other such contact methods such dynamic situations or planned outages creating a just in time dynamic alert system based in real time to the live-data deductions.

Finally, with respect to network security applications, the system methodology enables analysis of live-data network traffic for the purpose of identifying malicious content or agents as they enter the network at any determined location or between two or more points, in applications, packets, on devices or network elements. This identification and detection in concert with the packet sniper capabilities of automated alert and prescribed or dynamic/deduced actions can isolate, trap, or reject the passage of such threats from further movement through or into the network (or put of the network into further onwards data carriers or enterprise systems). While each of these various applications of the described methodology are only examples thereof, it would be appreciated by one skilled in the art that various other implementations of the methodology in accordance with the general process described herein may also be implemented.

Figure 14:
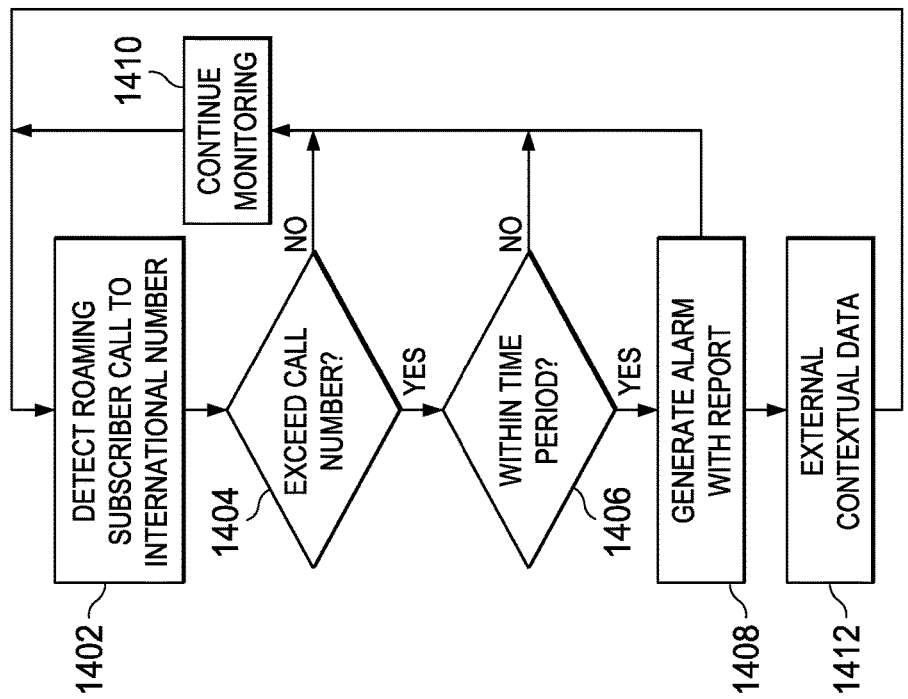
FIG. 14 is a flow diagram illustrating detection of international roaming fraud using a network live-data, real time data analysis system.

Referring now to FIG. 14-24, there are more particularly described implementations of various applications utilizing the methodology described herein with respect to FIGS. 1-13. FIG. 14 is a flow diagram relating to a use of the system 102 for detection of international roaming fraud. Perpetrators of international roaming fraud make international calls on stolen or purchased SIM cards with no intention of paying the roaming charges. Perpetrators steal SIM cards and make international calls or calls to premium numbers, leaving a large unpaid bill. In other occurrences, perpetrators purchase large blocks of SIM cards from the carrier country, roam out of country, and use the cards to call their own premium numbers, profiting off the calls and leaving the roaming charges to be absorbed by the carrier.

The present methodology would make use of the roaming data files provided by the roaming data file syndicator. This data may be used to detect patterns indicative of roaming fraud.

The system 102 can detect the number of outgoing calls from a single roaming subscriber to one or more international numbers at step 1402. Next, a determination is made at inquiry step 1404 as to whether the number of outgoing calls from a single roaming subscriber to one or more international numbers has exceeded a user configurable threshold and, if so, whether this has occurred within a user configurable period of time at inquiry step 1406. If the number of outgoing calls has exceeded the threshold within the configured time period, alarms with associated reports may be generated at step 1408. The alarm may be used to indicate to the network provider that an outgoing call threshold from the specified roaming subscriber number has been exceeded and further scrutiny is necessary. A drill down report generated along with the alarm is made available for the network provider that will list the international numbers that are being called. If inquiry steps 1404 and 1406 determine that the configurable call numbers or time periods have not been exceeded, control passes back to step 1410 to continue monitoring the roaming data at step 1402. Outcomes from 1408 are integrated with external contextual data at 1412, and this information is utilized by the semantic node 112 to calculate dynamic changes to any parameters relevant to the use case.

Figure 15:
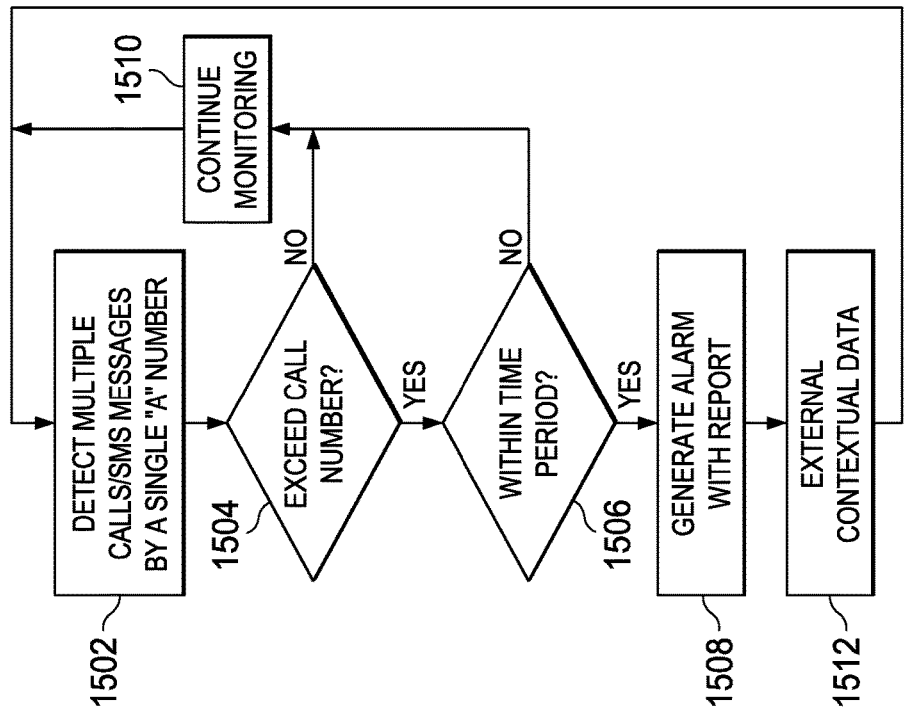
FIG. 15 is a flow diagram illustrating the detection, of Wangiri fraud using a network live-data, real time data monitoring system.

Referring now to FIG. 15, there is illustrated a manner in which the methodology may be used to detecting Wangiri fraud. Owners of premium numbers may drive traffic to their numbers by calling unsuspecting subscribers or sending them SMS messages to lure or trick them into calling the premium number. This is referred to as Wangiri fraud and frequently occurs over the weekend (between Friday evening and Monday morning) or during holidays when there are fewer people staging the carrier network and thus making it less likely they will notice traffic spikes indicating possible fraud. Subscribers will receive inbound calls from what may, at first glance, appear to be a local number. In some cases, the calls are brief and the recipient hears a baby crying or a woman screaming. After the call is disconnected, the subscriber will call back out of concern. In other cases, recipients may have missed the call during the night and will return it in the morning under the presumption that the call must have been important. In another variant, subscribers will receive an SMS message informing them that they have won a prize or have a gift to be delivered and they must call a number to arrange deliver. The customer calls the number, which is again an international premium number.

The methodology uses data sources consulted by the semantic node 112 that include known revenue share fraud databases or threat lists that have been built based on past calling behavior, carrier fraud and threat databases. In using the methodology of FIGS. 1-13 to detect Wangiri fraud, the system detects multiple calls/SMS messages from a single number or range, or an excessive number of calls/SMS messages at step 1502. The allowable number of SMS messages or calls is a user-configurable number. It is determined at inquiry step 1504 whether the configured number of call or SMS message number has been exceeded and whether this exceeded number has occurred within the user configured time period at inquiry step 1506. If so, alarms with associated reports may be generated at step 1508. Otherwise, the system continues monitoring at step 1510 until a problem condition is detected. Any outcome from 1508 is integrated with external contextual data at 1512 and this information is utilized by the semantic node 112 to calculate dynamic changes to any parameters relevant to the use case. This includes packet sniper conditions for alert or action statistical or risk scoring models, and/or additional information that can be provided back to the network carrier to enhance the alert or report contents at 1408. Examples include customer billing records to determine how the subscriber's current balance may affect their perceived risk in real-time, social analysis of calling maps to determine circles of subscribers involved with suspicious network activity, or contrasting the live network activity with the subscriber's 'normal' behavioral patterns to determine if an outlier or anomaly has been detected.

The reports generated in response to detection of this condition would include updates of all current fraud events updated with all victims who have received SMS or phone calls. The reports would show common numbers any victims are calling back in order to identify the callback numbers of the SMS attacks. The reports would further provide real-time calculations of KPIs and savings in the dashboard to show cost/call of each return call so analysts can track savings from the time the callback number is barred to customers. This will calculate how much it would have cost the customer had the Wangiri fraud not been identified and stopped. Thus, a particular savings benefit can be numerically defined for customers and the network provider.

Another type of fraud which may be detected by the system 102 is International Revenue Share fraud. This type of fraud invokes perpetrators making calls to international premium numbers on stolen or purchased SIM cards from within the carrier network. This type of fraud has two subtypes. Within the "number call out" scenario, subscribers call international premium numbers as evidenced by a sudden high number of outbound calls to a small range of destinations. This could indicate the usage of stolen SIMs or SIMs purchased with no intention to pay the full contract/bill. In this case, there is no correlated inbound trigger of calls from an international number as in Wangiri Fraud, and the calls are placed from within the carrier network, unlike the international roaming fraud. In the "country callout" scenario a high number of calls are suddenly placed to a specific country. These calls exceed the normal baseline call rates and the calls are placed from within the carrier network. External data sources may be consulted by the semantic node 112 in order to access known revenue sharing databases, threat lists that have been built on past calling behavior, carrier fraud and threat databases.

Figure 16:
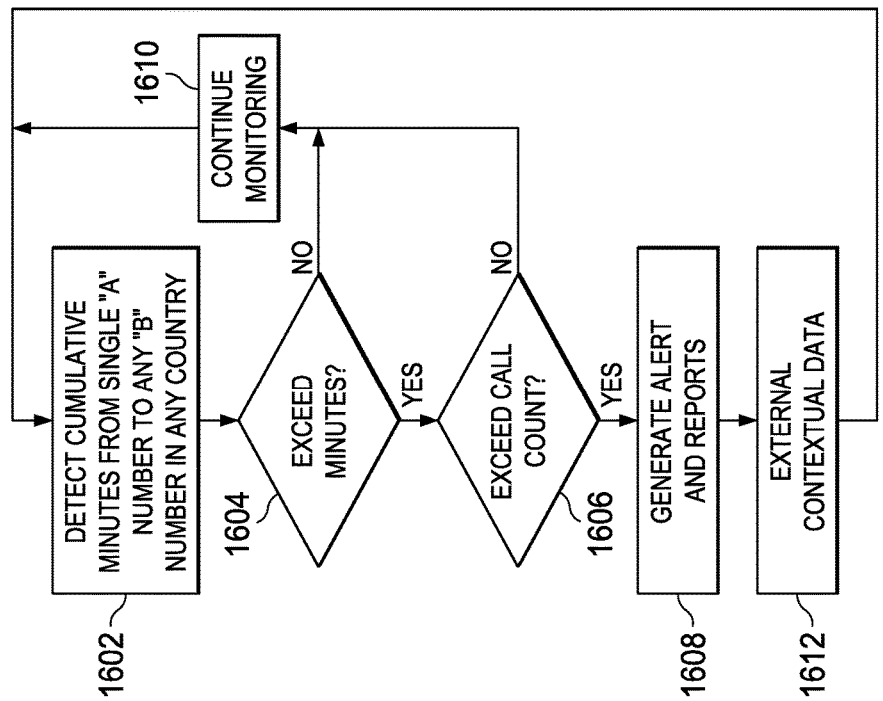
FIG. 16 illustrates a flow diagram for detecting a number callout scenario for international revenue share fraud using a network live-data, real time data monitoring system.

The calling patterns are detected in the manner illustrated in FIG. 16. With respect to the "number callout" scenario, the cumulative minutes from a single "A" number to any "B" number in any country is first detected at step 1602. Inquiry step 1604 determines if the cumulative minutes exceed a user defined threshold level and if so, inquiry step 1606 determines whether the cumulative minutes exceeded a call count from a single "A" number to any "B" number in any of the countries within a configurable time period. If so, an alert and associated report may be generated at step 1608. If the cumulative minutes have not been exceeded within a configured time period, or the call count has not been exceeded within a configured time period, the cumulative minutes are further monitored at step 1610 to continue monitoring for possible issues. Any outcome from 1608 is integrated with external contextual data at 1612, and this information is utilized by the semantic node 112 to calculate dynamic changes to any parameters relevant to the use case.

Figure 17:
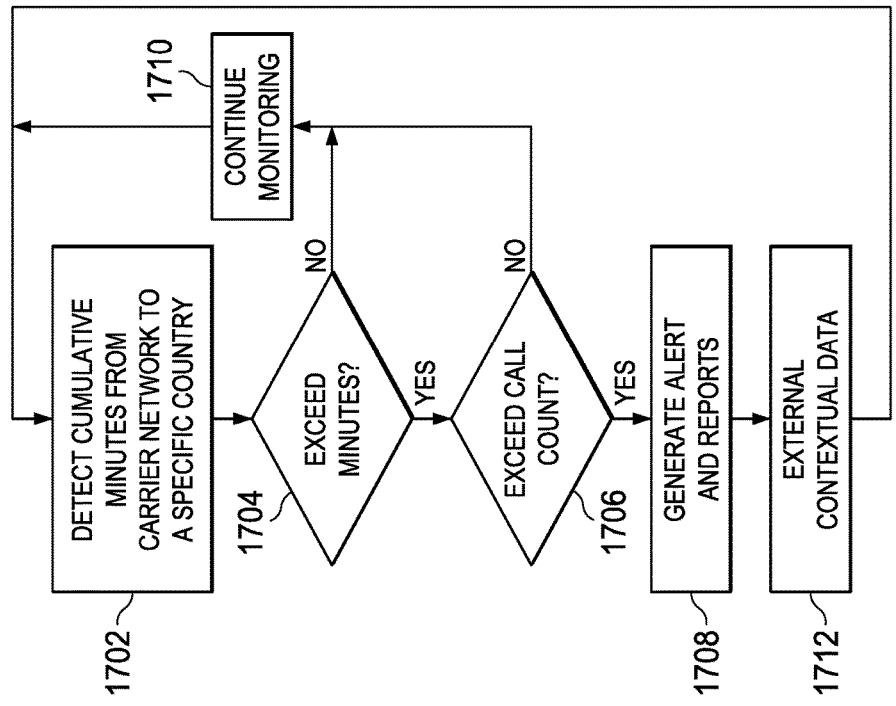
FIG. 17 is a flow diagram illustrating the detection of country callout international revenue share fraud using a network live-data, real time data monitoring system.

Referring now to FIG. 17 in the country callout configuration, at step 1702, the cumulative minutes from a carrier network to a specific country are first detected and inquiry step 1704 determines whether these cumulative minutes exceed a predetermined threshold within a defined time limit. If so, a further determination is made at step 1706 whether the cumulative minutes invoke an excessive call count threshold within a defined time period. If so, this causes the generation of alerts and reports at step 1708. If the threshold call limit or call count are not exceeded at step 1704 and 1706, respectively, control passes back to step 1710 to continue monitoring for issues. Any outcome from 1708 is integrated with external contextual data at 1712, and this information is utilized by the semantic node 112 to calculate dynamic changes to any parameters relevant to the use case. Both the semantic node 112 and the data in 1712 enable adjustments to the input parameters to adjust for the live-data conditions of the network. In the case of country-specific thresholds, this dynamic input enables variations to account for regular network baselines (which days of the week are highest/lowest traffic to and from each country, for example), as well as unexpected or uncontrollable factors such as world events (natural disasters, terror attacks, religious holidays) that prompt an unusual surge of traffic to or from specific locations.

The drilldown reports provided at 1608 and 1708 respectively can provide updates on the configurable time period of each fraud event. Reports may also provide a summary of each fraud alert for immediate scanning by an analyst, enabling them to determine how many A numbers/B numbers, cumulative duration, etc. The reports may also provide risk scoring of each alert based upon a configurable set of questions (e.g. are 90% of calls being answered, are majority of calls 2 minutes plus). The report may also provide risk scoring of each alert based upon an external big data contextualization (do any A numbers in this alert have a current balance owning greater than $X). The alert generations may comprise the provision of an application program interface to customer billing and customer profile information, as at 1612 and 1712. Finally, calling maps may be generated to show the relationship between anyone involved in the fraud event, showing all activity for the past 48 hours. These external data sources can be linked to semantic node 122 for ongoing automatic adjustment or feedback to the use case rules and can inform packet sniper in ingestor node 110 to be aware of specific subscribers, phone numbers, relationships, patterns, thresholds, or other factors, that, then encountered in the network traffic 104, will be automatically alerted on or actions/instructions sent to other systems. Examples include communications to network operations to terminate a call, bar a specific subscriber, prevent outbound calls to a specific phone number—all of these are actions to alter the specific activity as it is detected. This enables the carrier to prevent the losses from being incurred by intercepting the fraudulent activity before or while it happens.

Figure 18:
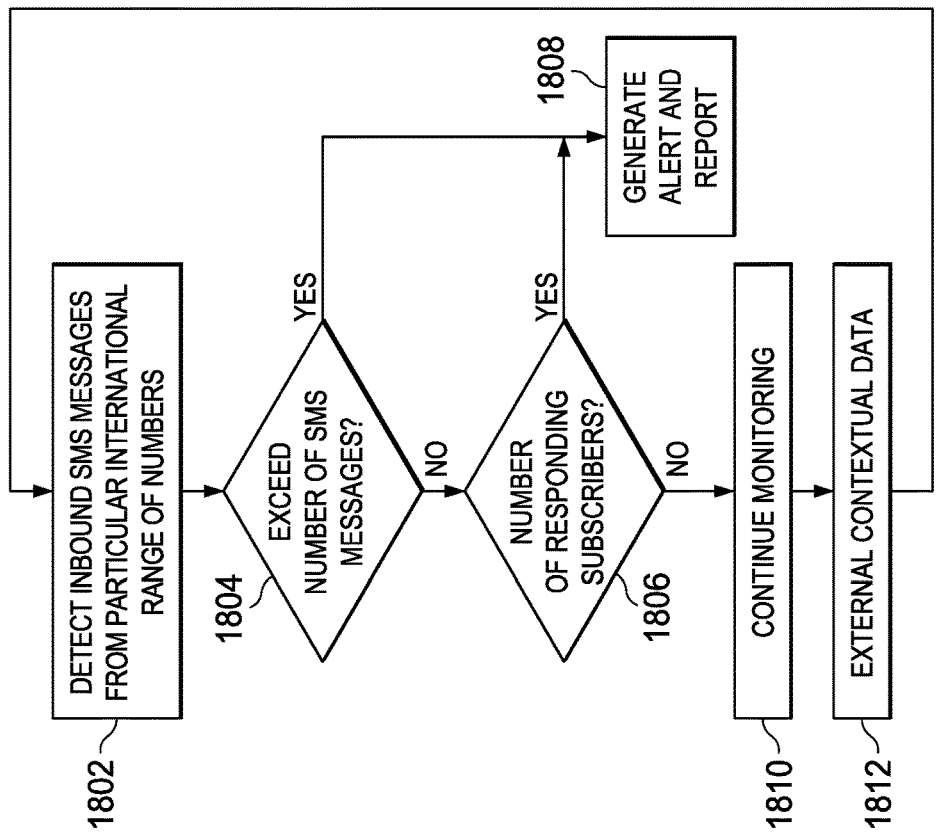
FIG. 18 is a flow diagram illustrating the detection of SMS fraud using a network live-data, real time data monitoring system.

Referring now to FIG. 18, there is illustrated the manner in which the system may detect inbound SMS fraud. Within the SMS fraud situation, subscribers receive SMS messages designed to trick them into either calling international premium numbers or clicking on links designed to phish for usernames and passwords to give access to private information. The system may detect inbound SMS messages at step 1802 that come from a particular international number or range of numbers. The determination is made at inquiry step 1804 whether the number of SMS messages exceeds a configurable limit established by the system. If so, an alert and associated report may be generated at step 1808. If a selected number of SMS messages has not been exceeded, control passes to inquiry step 1806 which determines id an allowable number or responding subscribers who have received the SMS message have dialed a same international number greater than a configurable threshold number of times within a configurable time period. If so, a report and alert are generated at step 1808. If not, control passes to step 1810 and SMS messages will continue to be monitored. To enhance this ongoing monitoring, external contextual data is integrated at 1812, and this information is utilized by the semantic node 112 to calculate dynamic changes to any parameters relevant to the use case. In this case, the contextual data enables, for example, correlation to identify common numbers being dialed—even if those numbers did not originate the inbound spam—so that action can be taken to bar, monitor or otherwise take action on parties involved in a fraud event as it is happening.

Figure 19:
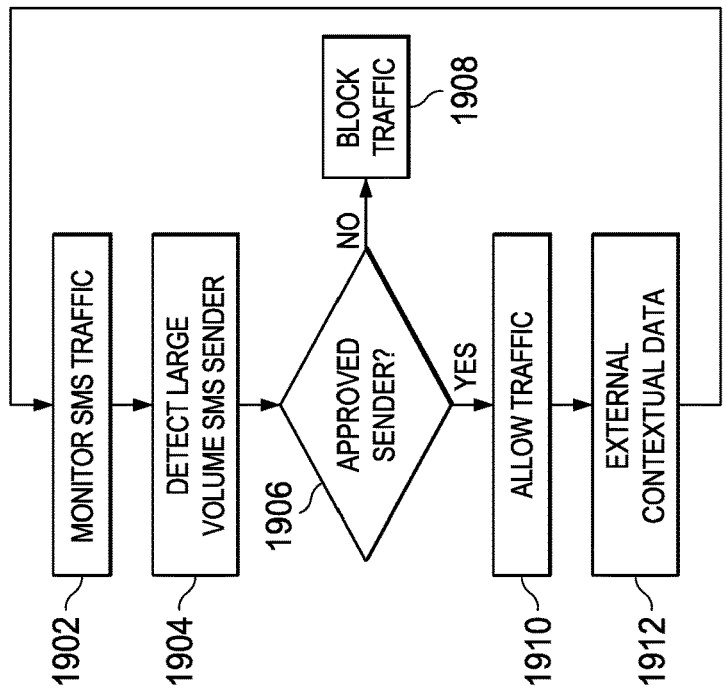
FIG. 19 illustrates the detection of SMS spam using a network live-data, real time data monitoring system.

FIG. 19 illustrates the use of the system to monitor for SMS spam. SMS traffic is tracked at step 1902 and upon detection at step 1904 of a large volume of SMS data from a particular SMS server, or source inquiry step 1906 determines whether the large volume SMS sender is an approved sender or an approved whitelist of approved SMS advertisers. If not, the traffic is blocked at step 1908. If the sender is an approved sender, the traffic is allowed at step 1910. External contextual data is integrated at 1912, and this information is utilized by the semantic node 112 to calculate dynamic changes to any parameters relevant to the use case. Dynamic factors in this use case can include inputs such as flexible whitelists cognizant of time-of-day or day-of-week, or specific special events during which time the parameters for certain SMS senders are different than at other times.

Figure 20:
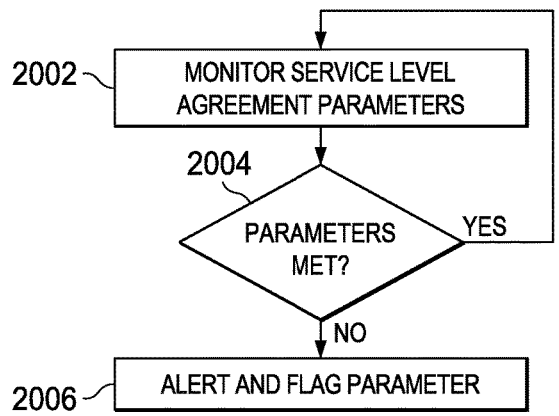
FIG. 20 illustrates a flow diagram for ensuring service level agreement compliance using a network live-data, real time data monitoring system.

Referring now to FIG. 20, there is illustrated the manner in which the system may be used to ensure service-level agreement compliance. Various service-level agreement (SLA) parameters are monitored in real-time at step 2002 and a determination is made 2004 whether all parameters are met. When inquiry step 2004 determines that certain parameters are not met, an alert/flag is generated at step 2006. If the parameters are met, control returns to step 2002 to continue monitoring the parameters. An example of this would be if international roaming files must be generated and submitted to a syndicate service within 4 hours of a call closure. The system automatically checks for SLA compliance and flags any roaming file that is not compliant so that it can be diverted to billing systems/department so that it is not paid back to the roaming carrier.

Figure 21:
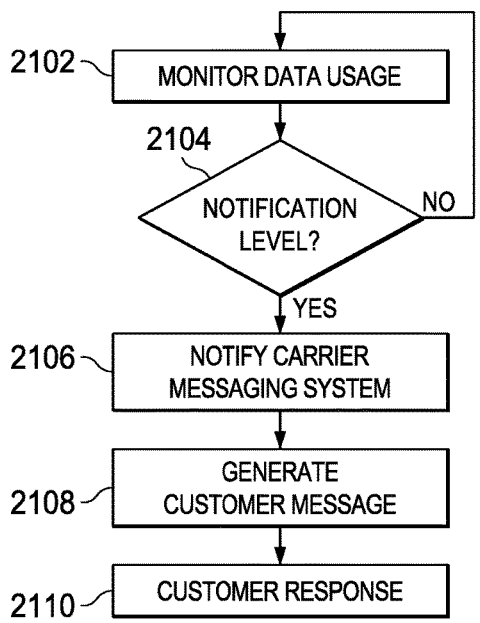
FIG. 21 is a flow diagram illustrating live-data usage verification and notification using a network live-data, real time data monitoring system.

Referring now to FIG. 21, there is illustrated the manner in which the system may be used to provide real-time live-data usage verification and notification in order to prevent bill shock for subscribers. Carrier must provide subscribers with up-to date data usage information so that subscribers do not inadvertently burst through the upper data limits and incur a large overcharge on their monthly bills. This required the ability to define thresholds of data usage for alerts based upon live customer activity. Responsive to these thresholds, notification triggers are provided to carrier messaging systems enabling further action by the subscribers to interact with the carrier to respond to their respective data usage position. Thus, subscriber data usage is monitored at step 2102 and when various notification levels are reached as determined at inquiry step 2104, a notification is provided to the carrier messaging system at step 2106. The carrier generates messages to the customer at step 2108, enabling a customer response at step 2110. Customer responses may range from upgrading their plan, blocking further data usage, shifting remaining data to shared devices or instantly adding data amounts to their device, etc. If no notification is needed at step 2104, the system continues monitoring data usage at step 2102. This is particularly important so that the carriers remain in compliance with regulatory mandates on overage charges, for customer satisfaction, and to maintain brand reputation.

Figure 22:
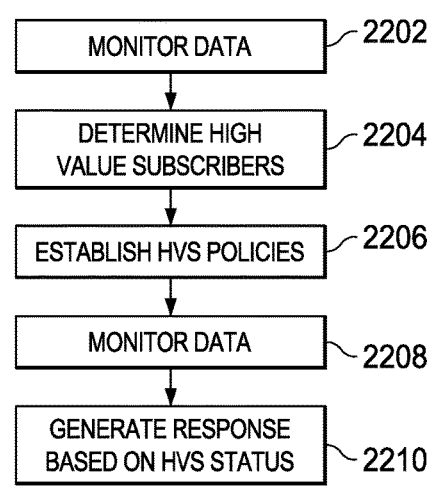
FIG. 22 is a flow diagram illustrating the provision of services to high value subscriber customers using a network live-data, real time data monitoring system.

Referring now to FIG. 22, the system is also useful in providing services to various high value subscribers. In order to bridge the current chasm between OSS and BSS toolsets, carriers can identify high-value subscribers (HVS) in real-time and set policies and rules for a variety of conditions and actions. These policies can be adjusted in real-time based upon the HVS score and controlled by customer care, network operations, marketing/promotions, etc. Examples of granularity include the ability to set automatic actions for subscribers with certain HVS levels and manual actions via dashboard for subscribers with other HVS scores. Thus, the system would monitor data usage at step 2202 and determine the high-value subscribers at 2204 in real-time. Policies are established for the high value subscribers at step 2206 and the data associated with the subscriber monitored at step 2208; responses based upon the HVS status are generated at step 2210. Examples of particular types of services which could be provided to HVS users include: HVS users that are determined to be victims of fraud or phishing can receive an SMS message if they are identified as a victim of an inbound fraud or phishing attempt. With respect to network quality of service the HVS will be flagged if they have x number of dropped or silent or incomplete calls, which are detected by the System 102 as they occur and are mapped against each HVS. The HVS can automatically receive an SMS with an apology and an offer of credit toward next month's bill. Based upon network voice and data usage patterns of the HVS, the carrier can choose to offer completely customized tariff plans. All-You-Can App offers include the option of paying per month for unlimited access to certain frequently used applications, with the data usage not counted against the data limits of the subscriber's base plan. This sort of offer must be calculated and maintained in real-time with live network traffic, as the billing system and the customer's real-time usage must be kept in sync.

Figure 23:
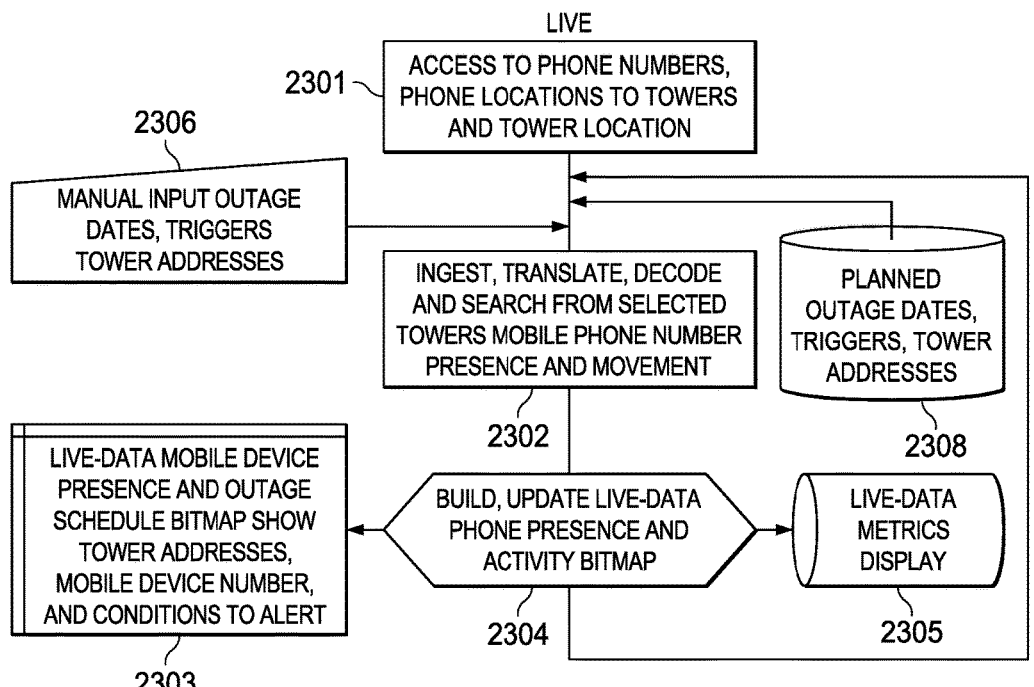
FIG. 23 illustrates planned network outage notifications for customers using a network live-data, real time data analysis system.
Figure 25:
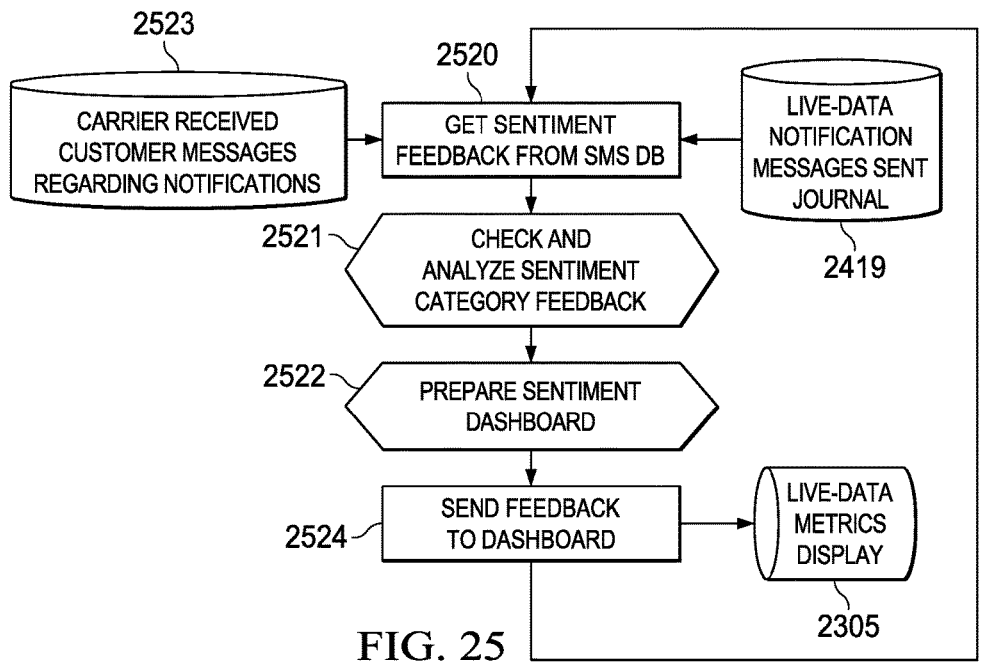
FIG. 25 illustrates the system provisions of real time sentiment analysis during a network outage using a network live-data, real time data analysis system.
Figure 24:
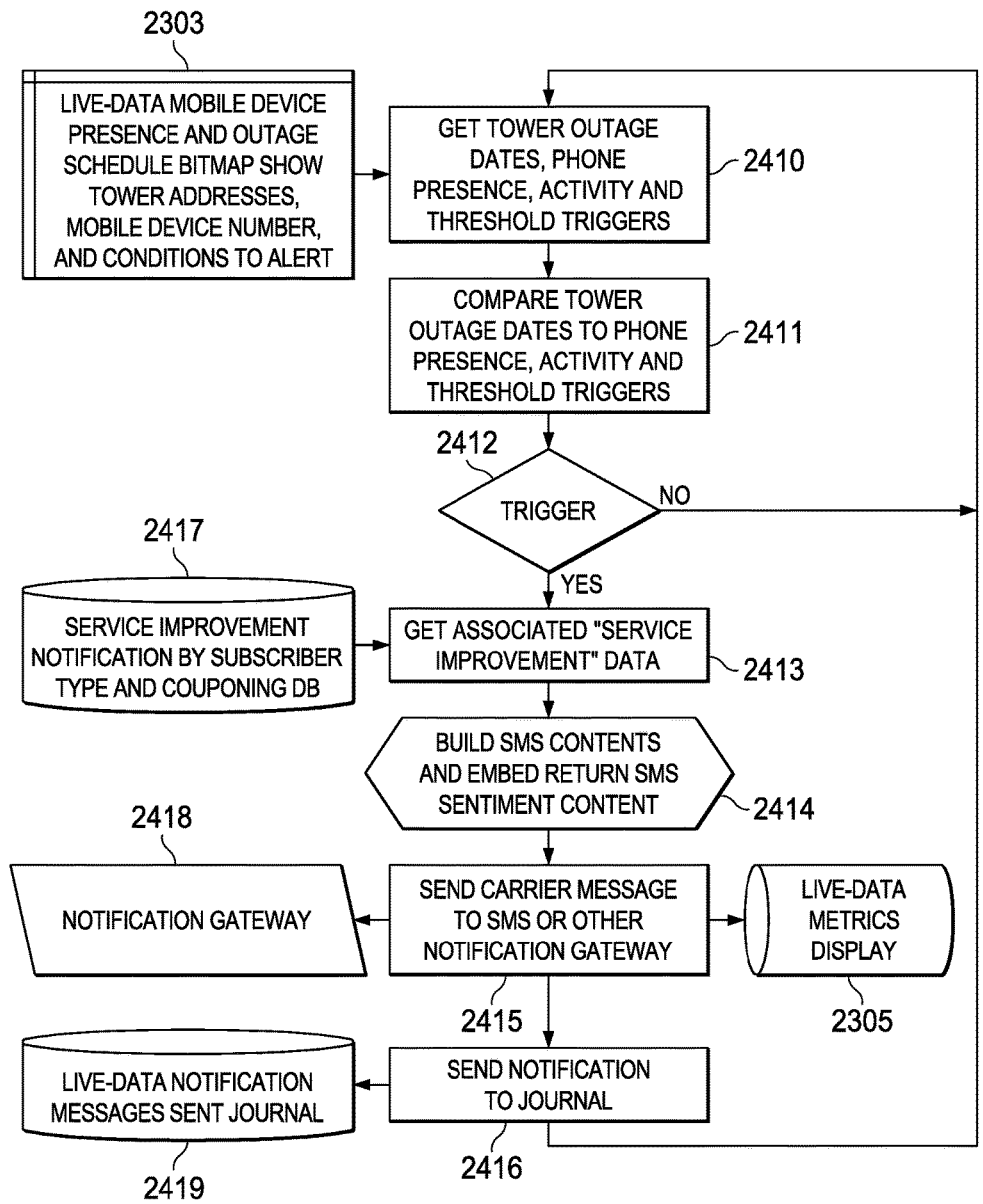
FIG. 24 illustrates the manner for providing network outage notifications to subscribers using a network live-data, real time data analysis system.

Referring now to FIGS. 23, 24 and 25, there is illustrated the manner in which the real-time data monitoring system may be used to provide network outage notifications. As carriers upgrade network infrastructure to 4G/LTE, cell towers and sites must periodically be brought down for planned maintenance. Additionally, unplanned outages occur with regularity. Carriers must be able to notify subscribers of these outages. The system can utilize contextual big data to model the cell site(s) subscribers spent the majority of their time in and automatically push SMS message notifications when there is a planned outage. In the case of an unplanned outage, or an outage that will affect subscribers that are not usually in that cell site but are headed toward it, the system can identify which subscribers will soon be approaching a degraded service area and send an SMS message to anyone who is signed up for "just in time" notifications.

FIG. 23 illustrates a situation for outage notification. In this case, the live-data source 2301 is any network element that provides cell tower location and mobile device address coupled with cell tower location to ingest VM process 2302. The ingest VM 2302 ingests this mirrored live-data and decodes and identifies data pertaining to the presence of mobile phone numbers within selected cell tower location. A relationship is built between these data points 2304, and sent onwards to a network topology bitmap 2303. As these mobile devices move geographically along with their human users, the related cell tower location data is continuously updated at 2302 and 2304 to build and represent a real-time, live-data representation of each mobile device's live movements.

Simultaneously, the planned cell tower outage schedules act as event triggers 2308, and manual updates and changes to these schedules 2306 are ingested by the ingest VM 2302. These are integrated at 2304 and sent onwards to the network topology bitmap 2303. The network topology bitmap 2303 represents a live-data mirror of device locations, the cell tower locations or planned or dynamically required outages for service improvements of those towers, as well as accessing a historical record of the presence of the device locations within the targeted cell tower locations. This historical record allows for a deductive process to occur as to the multiple locations over a period of time with regard to both individual devices as well as multiple cell towers. In this fashion, outage notifications can be based on both real-time (immediately-occurring), or historically based device presence in each cell tower location.

The role of the semantic node is shown in FIG. 24. The semantic node deductive processes 2410 and 2411 access the network topology bitmap 2203 and compare cell tower outage trigger dates with regard to the need for an action. Should action be required, process 2413 deduces the current and historic presence relationship of mobile devices to the triggered cell tower address and accesses prescribed notification content data 2417. Step 2414 builds the required notification and embeds and prescribed or dynamically available additional information based on customer status, carrier events or sentiment-analysis feedback. Step 2415 sends the completed message to the carrier notification gateway for transmission to the selected mobile device(s) or other communication endpoints and additionally sends notifications metrics for live-data displace 2305. Step 2416 sends a copy of the notification output to a journal 2419 for later analysis.

The ability for the system to provide real-time sentiment analysis to the carrier is illustrated in FIG. 25. Step 2520 retrieves 'sent' notification information 2419 and compares with feedback messages 2523 from carrier message hub. Step 2521 compares sentiment feedback with regard to keywords, timeliness of response to outage notification, redemption of included coupons, use of curse words, and other embedded criteria used to measure subscriber sentiment. Such information is compiled into a live-data report at 2522 and additionally readied for transmission at 2524 to display 2305 as live-data sentiment analysis with regard to the impact of the outage. Such live-data sentiment analysis provides time and opportunity for the carrier to respond in kind to the sentiment reporting.

A further example of the use of the real-time data monitoring system is with respect to network/core instrumentation and alerting. Examples of this include the ability to monitor, measure and alert on any network operation or function with the option to set configurable parameters for threshold, limits, alarms and performance optimums. In all cases, visualizations and queries can be drilled down to show innumerable combinations of data (e.g. calls by time, country, circuit partner, device, etc.) and time periods (real-time, immediate performance and drill down to show how immediate conditions compare against any desired time period of minutes, hours, days, weeks, months, etc.). In all cases, thresholds or performance norms can be set or changed in real-time by the customer and any deviation or desired alerting/alarming can be sent to a variety of destinations including dashboards, email, mobile devices or other applications, solutions or systems.

The system can measure the performance of network circuits (CICs) in real-time and provide visualization of all monitored CICs over a selectable time period to show trends and performance norms. When any single CIC or group of fellow CICs fall below the threshold which are configurable and changeable in real-time from the dashboard, alerts can be sent to the dashboard and/or to email, SMS, or other connected systems.

Measurements of total network traffic can be as granular as the customer desires. Measurements can include total calls in/out, total SMS in/out and any combination of drill down on these analyses including querying the data by circuit, by cell tower, by interconnected partner, by inbound or outbound traffic, by destination or origin country, by device type, by conversation length, etc. Anything that can be measured can be queried and displayed on the dashboard.

The system may be used to measure the ratio of answered to unanswered calls against a customer-configured threshold. Real-time data can be drilled down by any of the categories mentioned in the previous use case and thresholds can be changed in real-time. Alerts can be sent to a dashboard, email, SMS, or other systems. This system may also detect average conversation times and interconnect traffic data and provide alerts, reports, etc., based upon this information. Thus, using the above described system and method, real-time data flow within a network, via a connection to a particular network element, switch, etc., may be achieved in order to analyze the real-time data flow in order to generate analysis and reports of the data while the data is actively being generated before it exits the network for onward storage. This enables network providers to provide much more up to date and real-time responses to the analyzed data and achieve improvements to system performance and issues as these events are occurring rather than at a later date based upon post-data analysis.

It will be appreciated by those skilled in the art having the benefit of this disclosure that this system and method for real-time live-data analysis of network traffic provides a manner for monitoring and analyzing network content as the data is moving through the network and provides an ability to affect the outcome that ordinarily in the absence of such a system and method would be non-affected in relationship to its normal course of business.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A set of one or more tangible, non-transitory, machine-readable media storing instructions that when executed by one or more processors effectuate operations to monitor network traffic, the operations comprising:
   obtaining, with one or more processors, a mirrored data flow of network traffic routed through a network element of a network, wherein:

the network traffic is transmitted as packets, via the network element, between respective endpoints in communication with the network;
respective portions of the packets are encoded according to a plurality of different respective protocols;
the network traffic includes packets having instructions by which network events are effectuated; and
the network events include network session events;
before a first network session event among the network session events completes, determining, with one or more processors, based on at least part of the mirrored data flow, that the first network session event is actionable, wherein determining that the first network session event is actionable comprises:
filtering the packets in the mirrored data flow to identify a subset of the packets pertaining to a type of network session events based on the subset of the packets being encoded in one or more protocols that are a specified subset of protocols among the plurality of protocols;
writing the subset of the packets from the mirrored data flow to a buffer;
decoding at least some of the subset of the packets to obtain decoded information by which the first network session event is requested to be effectuated;
comparing the decoded information of the first network session event to a plurality of conditions specified by a plurality of rules; and
based on at least part of the comparison, determining that the first network session event is actionable;
in response to the determining that the first network session event is actionable, with one or more processors, causing an intervention in the first network session before the first network session completes; and
determining, with one or more processors, that a second network session event among the network sessions is not actionable.

2. A set of one or more tangible, non-transitory, machine-readable media storing instructions that when executed by one or more processors effectuate operations to monitor network traffic on a network by which phone calls are effectuated, the operations comprising:
obtaining, with one or more processors, a mirrored data flow of network traffic routed through a network element of a network, wherein:
the network traffic is transmitted as packets, via the network element, between respective endpoints in communication with the network;
respective portions of the packets are encoded according to a plurality of different respective protocols;
the network traffic includes packets having instructions by which network events are effectuated;
the network events include phone call events; and
at least some instructions included in the network traffic by which phone call network events are effectuated include an identifier of a respective called phone number and an identifier of a respective calling phone number of at least some respective phone call events;
before a first phone call event among the network events completes, determining, with one or more processors, based on at least part of the mirrored data flow, that the first phone call event is actionable, wherein determining that the first phone call event is actionable comprises:
filtering the packets in the mirrored data flow to identify a subset of the packets pertaining to phone call events based on the subset of the packets being encoded in one or more protocols that are a specified subset of protocols among the plurality of protocols;
writing the subset of the packets from the mirrored data flow to a buffer;
decoding at least some of the subset of the packets to obtain decoded information by which the first phone call event is requested to be effectuated;
comparing the decoded information of the first phone call event to a plurality of conditions specified by a plurality of rules; and
based on at least part of the comparison, determining that the first phone call event is actionable;
in response to the determining that the first phone call event is actionable, with one or more processors, causing an intervention in the first phone call event before the first phone call event completes.

3. The media of claim 2, wherein:
the mirrored data flow is obtained from a port mirror with a parallel observe and duplicate process and not by being a network element process of pass-through-stop-copy-and-forward.

4. The media of claim 2, wherein:
the network traffic includes SS7 network traffic;
the one or more protocols of the filtering include ISUP, TCAP, or MAP protocols; and
the decoded information including an identifier of a called or calling phone number of the first phone call event.

5. The media of claim 2, wherein:
the plurality of rules include a first rule specifying a first condition, the first condition being a specified calling phone number and the first rule specifying that phone call events are actionable based on phone call events designating the specified calling phone number as a caller; and
the plurality of rules include a second rule specifying a second condition, the second condition being a specified called phone number and the second rule specifying that phone call events are actionable based on phone call events designating the specified called phone number as being called.

6. The media of claim 5, wherein:
the first rule specifies a first action responsive to the first rule;
the second rule specifies a second action responsive to the second rule; and
the first action is different from the second action.

7. The media of claim 2, wherein:
decoding comprises analyzing packets in the buffer by three or more protocol decoders operating independently in parallel and with no fixed ordering.

8. The media of claim 2, wherein:
the buffer provides no-lock, variable time latency multi-processing of individual packets.

9. The media of claim 2, the operations comprising:
allocating, to the buffer, as a single block of memory non-contiguous blocks grouped as a virtual contiguous allocation of memory.

10. The media of claim 2, wherein the operations comprise:
steps for simultaneous processing of data packets.

11. The media of claim 2, wherein the operations comprise:
after comparing, releasing memory addresses of the buffer storing compared packets; and based on the comparing, determining to perform subsequent analysis after the comparing, the subsequent analysis comprising:
    storing the information by which the first phone call event is requested to be effectuated in an in-memory database that is different from the buffer; and
    after storing, executing the subsequent analysis of data in the in-memory database corresponding to a window of time specified by an application use case.

12. The media of claim 11, wherein the subsequent analysis comprises relational processing language driven analysis.

13. The media of claim 11, wherein the subsequent analysis comprises applying a statistical model to the data in the in-memory database corresponding to the window of time.

14. The media of claim 11, wherein the operations comprise:
    changing at least some of the rules in response to the subsequent analysis.

15. The media of claim 2, wherein the operations comprise:
    steps for detecting international roaming fraud.

16. The media of claim 2, wherein the operations comprise:
    steps for detecting Wangiri fraud.

17. The media of claim 2, wherein the operations comprise:
    steps for detecting a number callout scenario for international revenue share fraud.

18. The media of claim 2, wherein the operations comprise:
    steps for detecting country callout international revenue share fraud.

19. The media of claim 2, wherein the operations comprise:
    steps for detecting SMS fraud.

20. The media of claim 2, wherein the operations comprise:
    steps for detecting SMS spam.

21. The media of claim 2, wherein the operations comprise:
    steps for ensuring service level agreement compliance.

22. The media of claim 2, wherein the operations comprise:
    steps for live-data usage verification and notification.

23. The media of claim 2, wherein the operations comprise:
    instantiating an ingestor node; and
    instantiating a semantic node.

24. The media of claim 23, wherein the operations comprise:
    executing a first set of virtual machines configured to filtering the packets; and
    executing a second set of virtual machines configured to analyze filtered packets and determine whether to change the filtering, wherein the first set of virtual machines is different from the second set of virtual machines.

25. The media of claim 2, wherein causing the intervention in the first phone call event before the first phone call event completes comprises:
    causing the first phone call event to be shaped.

26. The media of claim 2, wherein causing the intervention in the first phone call event before the first phone call event completes comprises:
    causing the first phone call event to be truncated.

27. The media of claim 2, wherein causing the intervention in the first phone call event before the first phone call event completes comprises:
    causing the first phone call event to be redirected.

28. The media of claim 2, wherein causing the intervention in the first phone call event before the first phone call event completes comprises:
    causing the first phone call event to be trapped.

29. The media of claim 2, wherein causing the intervention in the first phone call event before the first phone call event completes comprises:
    causing the first phone call event to be stopped.

30. The media of claim 2, wherein the one or more protocols include voice-over-Internet-Protocol.

31. A method, comprising:
    obtaining, with one or more processors, a mirrored data flow of network traffic routed through a network element of a network, wherein:
        the network traffic is transmitted as packets, via the network element, between respective endpoints in communication with the network;
        respective portions of the packets are encoded according to a plurality of different respective protocols;
        the network traffic includes packets having instructions by which network events are effectuated;
        the network events include phone call events; and
        at least some instructions included in the network traffic by which phone call network events are effectuated include an identifier of a respective called phone number and an identifier of a respective calling phone number of at least some respective phone call events;
    before a first phone call event among the network events completes, determining, with one or more processors, based on at least part of the mirrored data flow, that the first phone call event is actionable, wherein determining that the first phone call event is actionable comprises:
        filtering the packets in the mirrored data flow to identify a subset of the packets pertaining to phone call events based on the subset of the packets being encoded in one or more protocols that are a specified subset of protocols among the plurality of protocols;
        writing the subset of the packets from the mirrored data flow to a buffer;
        decoding at least some of the subset of the packets to obtain decoded information by which the first phone call event is requested to be effectuated;
        comparing the decoded information of the first phone call event to a plurality of conditions specified by a plurality of rules; and
        based on at least part of the comparison, determining that the first phone call event is actionable;
    in response to the determining that the first phone call event is actionable, with one or more processors, causing an intervention in the first phone call event before first the phone call event completes.

* * * * *